US008024648B2

(12) United States Patent
Foehr et al.

(10) Patent No.: US 8,024,648 B2
(45) Date of Patent: *Sep. 20, 2011

(54) PLANAR MAPPING OF GRAPHICAL ELEMENTS

(75) Inventors: Oliver H. Foehr, Mercer Island, WA (US); Joseph D. Ternasky, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/370,383

(22) Filed: Feb. 12, 2009

(65) Prior Publication Data

US 2009/0185222 A1 Jul. 23, 2009

Related U.S. Application Data

(63) Continuation of application No. 10/935,025, filed on Sep. 7, 2004, now Pat. No. 7,519,899.

(60) Provisional application No. 60/567,679, filed on May 3, 2004, provisional application No. 60/567,663, filed on May 3, 2004, provisional application No. 60/567,890, filed on May 3, 2004, provisional application No. 60/567,920, filed on May 3, 2004, provisional application No. 60/567,830, filed on May 3, 2004, provisional application No. 60/568,071, filed on May 3, 2004.

(51) Int. Cl.
*G06F 17/00* (2006.01)
(52) U.S. Cl. ...................................... 715/200
(58) Field of Classification Search .......... 715/211, 715/200; 345/22, 24
See application file for complete search history.

(56) References Cited

U.S. PATENT DOCUMENTS

| | | |
|---|---|---|
| 4,410,286 A | 10/1983 | Ko et al. |
| 4,594,674 A | 6/1986 | Boulia et al. |
| 4,649,513 A | 3/1987 | Martin et al. |
| 4,870,611 A | 9/1989 | Martin et al. |
| 5,179,702 A | 1/1993 | Spix et al. |
| 5,222,205 A | 6/1993 | Larson et al. |
| 5,469,532 A | 11/1995 | Gerlach et al. |
| 5,469,533 A | 11/1995 | Dennis |
| 5,487,138 A | 1/1996 | Rust et al. |
| 5,537,526 A | 7/1996 | Anderson et al. |
| 5,613,124 A | 3/1997 | Atkinson et al. |
| 5,699,493 A | 12/1997 | Davidson, Jr. et al. |
| 5,727,220 A | 3/1998 | Hohensee et al. |
| 5,745,121 A | 4/1998 | Politis |
| 5,745,122 A | 4/1998 | Gay et al. |
| 5,745,910 A | 4/1998 | Piersol et al. |
| 5,752,055 A | 5/1998 | Redpath et al. |

(Continued)

OTHER PUBLICATIONS

Duce et al., Web 2D Graphics File Formats, Google 2003, pp. 43-64.*

(Continued)

*Primary Examiner* — Cong-Lac Huynh
(74) *Attorney, Agent, or Firm* — Lee & Hayes, PLLC

(57) ABSTRACT

Planar rendering is described. In an implementation, a method includes approximating a shape that corresponds to an overlapping portion of at least one graphical element that is translucent with another graphical element. A color is computed for the approximated shape from respective colors of each of the graphical elements and the translucence of the at least one graphical element. The approximated shape having the computed color is formed into a communication for output to a printer.

20 Claims, 12 Drawing Sheets

U.S. PATENT DOCUMENTS

| | | |
|---|---|---|
| 5,752,056 A | 5/1998 | Celik |
| 5,806,078 A | 9/1998 | Hug et al. |
| 5,819,295 A | 10/1998 | Nakagawa et al. |
| 5,845,058 A | 12/1998 | Shaw et al. |
| 5,903,903 A | 5/1999 | Kennedy |
| 5,905,504 A | 5/1999 | Barkans et al. |
| 5,911,138 A | 6/1999 | Li et al. |
| 5,920,684 A | 7/1999 | Hastings et al. |
| 5,940,581 A | 8/1999 | Lipton |
| 5,950,215 A | 9/1999 | Tabuchi |
| 5,960,168 A | 9/1999 | Shaw et al. |
| 5,993,088 A | 11/1999 | Nogay et al. |
| 6,005,574 A * | 12/1999 | Herrod ............................ 715/807 |
| 6,026,416 A | 2/2000 | Kanerva et al. |
| 6,070,175 A | 5/2000 | Mezei |
| 6,094,665 A | 7/2000 | Lyons et al. |
| 6,115,044 A * | 9/2000 | Alimpich et al. ............ 715/855 |
| 6,134,552 A | 10/2000 | Fritz et al. |
| 6,138,162 A | 10/2000 | Pistriotto et al. |
| 6,144,974 A | 11/2000 | Gartland |
| 6,173,295 B1 | 1/2001 | Goertz et al. |
| 6,182,080 B1 | 1/2001 | Clements |
| 6,182,096 B1 | 1/2001 | Mastie et al. |
| 6,195,676 B1 | 2/2001 | Spix et al. |
| 6,199,082 B1 | 3/2001 | Ferrel et al. |
| 6,212,530 B1 | 4/2001 | Kadlec |
| 6,247,018 B1 | 6/2001 | Rheaume |
| 6,247,066 B1 | 6/2001 | Tanaka |
| 6,269,403 B1 | 7/2001 | Anders |
| 6,344,855 B1 | 2/2002 | Fisher et al. |
| 6,362,870 B2 | 3/2002 | Mui et al. |
| 6,385,727 B1 | 5/2002 | Cassagnol et al. |
| 6,393,442 B1 | 5/2002 | Cromarty et al. |
| 6,407,821 B1 | 6/2002 | Hohensee et al. |
| 6,418,448 B1 | 7/2002 | Sarkar |
| 6,427,230 B1 | 7/2002 | Goiffon et al. |
| 6,447,184 B2 | 9/2002 | Kimura et al. |
| 6,449,653 B2 | 9/2002 | Klemets et al. |
| 6,457,017 B2 | 9/2002 | Watkins et al. |
| 6,466,935 B1 | 10/2002 | Stuart |
| 6,480,206 B2 | 11/2002 | Prinzing |
| 6,498,657 B1 | 12/2002 | Kuntz et al. |
| 6,505,219 B1 | 1/2003 | MacLean et al. |
| 6,507,858 B1 | 1/2003 | Kanerva et al. |
| 6,519,557 B1 | 2/2003 | Emens et al. |
| 6,538,760 B1 | 3/2003 | deBry et al. |
| 6,549,918 B1 | 4/2003 | Probert, Jr. et al. |
| 6,559,966 B1 * | 5/2003 | Laverty et al. ................ 358/1.15 |
| 6,560,620 B1 | 5/2003 | Ching |
| 6,571,279 B1 | 5/2003 | Herz et al. |
| 6,583,789 B1 | 6/2003 | Carlson et al. |
| 6,587,128 B2 * | 7/2003 | Kanevsky et al. ............ 715/768 |
| 6,591,278 B1 | 7/2003 | Ernst |
| 6,604,144 B1 | 8/2003 | Anders |
| 6,608,693 B1 | 8/2003 | Loyd et al. |
| 6,609,200 B2 | 8/2003 | Anderson et al. |
| 6,615,281 B1 | 9/2003 | Temple, III |
| 6,654,147 B1 | 11/2003 | Ramot |
| 6,657,647 B1 | 12/2003 | Bright |
| 6,658,477 B1 | 12/2003 | Lisitsa et al. |
| 6,674,540 B1 | 1/2004 | Wiechers et al. |
| 6,675,353 B1 | 1/2004 | Friedman |
| 6,675,356 B1 | 1/2004 | Adler et al. |
| 6,681,223 B1 | 1/2004 | Sundaresan |
| 6,715,126 B1 | 3/2004 | Chang et al. |
| 6,763,343 B1 | 7/2004 | Brooke et al. |
| 6,771,291 B1 | 8/2004 | DiStefano, III |
| 6,781,609 B1 | 8/2004 | Barker et al. |
| 6,785,654 B2 | 8/2004 | Cyr et al. |
| 6,789,229 B1 | 9/2004 | Dunietz et al. |
| 6,812,941 B1 | 11/2004 | Brown et al. |
| 6,826,626 B1 | 11/2004 | McManus |
| 6,867,874 B1 | 3/2005 | Shima |
| 6,891,632 B2 | 5/2005 | Schwartz |
| 6,910,843 B2 | 6/2005 | Saw et al. |
| 6,917,976 B1 | 7/2005 | Slaughter et al. |
| 6,925,597 B2 | 8/2005 | Anwar |
| 6,925,631 B2 | 8/2005 | Golden |
| 6,941,511 B1 | 9/2005 | Hind et al. |
| 6,944,515 B2 | 9/2005 | Nakajima et al. |
| 6,952,801 B2 | 10/2005 | Warmus et al. |
| 6,968,557 B1 | 11/2005 | Zhang et al. |
| 6,990,654 B2 | 1/2006 | Carroll, Jr. |
| 6,992,785 B1 | 1/2006 | Chatcavage et al. |
| 7,017,162 B2 | 3/2006 | Smith et al. |
| 7,027,660 B2 | 4/2006 | Hersch et al. |
| 7,043,688 B1 | 5/2006 | Tsutsumi et al. |
| 7,047,237 B2 | 5/2006 | Suzuki et al. |
| 7,051,276 B1 | 5/2006 | Mogilevsky et al. |
| 7,051,330 B1 | 5/2006 | Kaler et al. |
| 7,092,963 B2 | 8/2006 | Ryan et al. |
| 7,106,275 B2 | 9/2006 | Brunner et al. |
| 7,131,060 B1 | 10/2006 | Azuma |
| 7,134,071 B2 | 11/2006 | Ohwada et al. |
| 7,136,941 B2 | 11/2006 | Nguyen et al. |
| 7,162,538 B1 | 1/2007 | Cordova |
| 7,171,471 B1 | 1/2007 | Nair |
| 7,181,731 B2 | 2/2007 | Pace et al. |
| 7,209,921 B2 | 4/2007 | Pace et al. |
| 7,271,935 B2 | 9/2007 | Coons et al. |
| 7,274,483 B2 | 9/2007 | Aiyama et al. |
| 7,295,336 B2 * | 11/2007 | Yoshida et al. .............. 358/1.15 |
| 7,302,634 B2 | 11/2007 | Lucovsky et al. |
| 7,359,902 B2 | 4/2008 | Ornstein et al. |
| 7,426,525 B2 | 9/2008 | Sayers et al. |
| 7,487,464 B2 * | 2/2009 | Grotjohn et al. .............. 715/797 |
| 7,512,265 B1 * | 3/2009 | Skirko .......................... 382/162 |
| 7,719,546 B1 * | 5/2010 | Yhann et al. .................. 345/629 |
| 7,755,786 B2 * | 7/2010 | Foehr et al. .................. 358/1.15 |
| 2001/0003828 A1 | 6/2001 | Peterson et al. |
| 2001/0013043 A1 | 8/2001 | Wagner |
| 2001/0013947 A1 * | 8/2001 | Van Der Linden et al. .. 358/1.15 |
| 2001/0018697 A1 | 8/2001 | Kunitake et al. |
| 2001/0022592 A1 * | 9/2001 | Alimpich et al. ............. 345/781 |
| 2001/0043358 A1 | 11/2001 | Schwartz |
| 2001/0044809 A1 | 11/2001 | Parasnis et al. |
| 2002/0002667 A1 | 1/2002 | Kelsey et al. |
| 2002/0049790 A1 | 4/2002 | Ricker et al. |
| 2002/0065848 A1 | 5/2002 | Walker et al. |
| 2002/0073236 A1 | 6/2002 | Helgeson et al. |
| 2002/0085020 A1 | 7/2002 | Carroll |
| 2002/0087602 A1 | 7/2002 | Masuda et al. |
| 2002/0089691 A1 | 7/2002 | Fertlitsch et al. |
| 2002/0099797 A1 | 7/2002 | Merrell et al. |
| 2002/0107886 A1 | 8/2002 | Gentner et al. |
| 2002/0111133 A1 | 8/2002 | Wittkotter |
| 2002/0143523 A1 | 10/2002 | Balaji et al. |
| 2002/0174145 A1 | 11/2002 | Duga et al. |
| 2002/0188638 A1 | 12/2002 | Hamscher |
| 2003/0009672 A1 | 1/2003 | Goodman |
| 2003/0018694 A1 | 1/2003 | Chen et al. |
| 2003/0028560 A1 | 2/2003 | Kudrolli et al. |
| 2003/0050932 A1 | 3/2003 | Pace et al. |
| 2003/0078829 A1 | 4/2003 | Chen et al. |
| 2003/0079181 A1 | 4/2003 | Schumacher et al. |
| 2003/0093520 A1 | 5/2003 | Beesley |
| 2003/0126136 A1 | 7/2003 | Omoigui |
| 2003/0137539 A1 | 7/2003 | Dees |
| 2003/0142325 A1 | 7/2003 | Leslie |
| 2003/0149934 A1 | 8/2003 | Worden |
| 2003/0158851 A1 | 8/2003 | Britton et al. |
| 2003/0163552 A1 | 8/2003 | Savitzky et al. |
| 2003/0163589 A1 | 8/2003 | Bunce et al. |
| 2003/0167356 A1 | 9/2003 | Smith et al. |
| 2003/0172168 A1 | 9/2003 | Mak et al. |
| 2003/0182152 A1 | 9/2003 | Nakajima et al. |
| 2003/0182311 A1 | 9/2003 | Nakajima et al. |
| 2003/0182450 A1 | 9/2003 | Ong et al. |
| 2003/0182656 A1 | 9/2003 | Leathers et al. |
| 2003/0187534 A1 | 10/2003 | Suzuki et al. |
| 2003/0187612 A1 | 10/2003 | Miyake |
| 2003/0187870 A1 | 10/2003 | Nakajima et al. |
| 2003/0195784 A1 | 10/2003 | Smith |
| 2003/0204495 A1 | 10/2003 | Lehnert |
| 2003/0229845 A1 | 12/2003 | Salesin et al. |
| 2003/0233420 A1 | 12/2003 | Stark et al. |
| 2004/0003388 A1 | 1/2004 | Jacquemot et al. |

| | | | |
|---|---|---|---|
| 2004/0003448 | A1 | 1/2004 | Morrow et al. |
| 2004/0021905 | A1 | 2/2004 | Holmstead et al. |
| 2004/0032611 | A1 | 2/2004 | Daly et al. |
| 2004/0034848 | A1 | 2/2004 | Moore et al. |
| 2004/0047643 | A1* | 3/2004 | Jackelen et al. ............... 399/81 |
| 2004/0049737 | A1 | 3/2004 | Simon Hunt et al. |
| 2004/0054669 | A1 | 3/2004 | Seyrat et al. |
| 2004/0061729 | A1 | 4/2004 | Green et al. |
| 2004/0066527 | A1 | 4/2004 | Kloosterman et al. |
| 2004/0078755 | A1 | 4/2004 | Shinjo et al. |
| 2004/0080764 | A1 | 4/2004 | Sievert et al. |
| 2004/0083430 | A1* | 4/2004 | Boonen ................... 715/523 |
| 2004/0103073 | A1 | 5/2004 | Blake et al. |
| 2004/0111418 | A1 | 6/2004 | Nguyen et al. |
| 2004/0117733 | A1 | 6/2004 | Moreau et al. |
| 2004/0130741 | A1 | 7/2004 | Ferlitsch |
| 2004/0139049 | A1 | 7/2004 | Hancock et al. |
| 2004/0153467 | A1 | 8/2004 | Conover et al. |
| 2004/0160613 | A1 | 8/2004 | Kurotsu et al. |
| 2004/0167941 | A1 | 8/2004 | Prahlad et al. |
| 2004/0183837 | A1 | 9/2004 | Watanabe et al. |
| 2004/0194025 | A1 | 9/2004 | Hubert et al. |
| 2004/0205623 | A1 | 10/2004 | Weil et al. |
| 2004/0205653 | A1 | 10/2004 | Hadfield et al. |
| 2004/0207869 | A1 | 10/2004 | Endo |
| 2004/0216048 | A1 | 10/2004 | Brown et al. |
| 2004/0225960 | A1 | 11/2004 | Parikh et al. |
| 2004/0267553 | A1 | 12/2004 | Brunton |
| 2004/0268304 | A1 | 12/2004 | Kuo et al. |
| 2005/0005233 | A1 | 1/2005 | Kays et al. |
| 2005/0015767 | A1 | 1/2005 | Nash et al. |
| 2005/0071385 | A1 | 3/2005 | Rao |
| 2005/0086030 | A1 | 4/2005 | Zeidman |
| 2005/0091574 | A1 | 4/2005 | Maaniitty et al. |
| 2005/0097441 | A1 | 5/2005 | Herbach et al. |
| 2005/0099398 | A1 | 5/2005 | Garside et al. |
| 2005/0125720 | A1 | 6/2005 | Little et al. |
| 2005/0132279 | A1 | 6/2005 | Relyea et al. |
| 2005/0132304 | A1 | 6/2005 | Guido et al. |
| 2005/0138540 | A1 | 6/2005 | Baltus et al. |
| 2005/0144556 | A1 | 6/2005 | Petersen et al. |
| 2005/0187803 | A1 | 8/2005 | Jain et al. |
| 2005/0190186 | A1 | 9/2005 | Klassen |
| 2005/0198069 | A1 | 9/2005 | Cherry et al. |
| 2005/0210026 | A1 | 9/2005 | Wood |
| 2005/0210227 | A1 | 9/2005 | Emerson et al. |
| 2005/0223312 | A1 | 10/2005 | Erdtmann et al. |
| 2005/0251742 | A1 | 11/2005 | Mogilevsky et al. |
| 2005/0278240 | A1 | 12/2005 | Delenda |
| 2005/0278616 | A1 | 12/2005 | Eller |
| 2005/0278626 | A1 | 12/2005 | Malik |
| 2005/0286063 | A1 | 12/2005 | Owen et al. |
| 2006/0031749 | A1 | 2/2006 | Schramm et al. |
| 2006/0041838 | A1 | 2/2006 | Khan |
| 2006/0047743 | A1 | 3/2006 | Yuan et al. |
| 2006/0056334 | A1 | 3/2006 | Yuan et al. |
| 2006/0080316 | A1 | 4/2006 | Gilmore et al. |
| 2006/0117019 | A1 | 6/2006 | Sylthe et al. |
| 2006/0117268 | A1 | 6/2006 | Talley et al. |
| 2006/0136827 | A1 | 6/2006 | Villaron et al. |
| 2006/0146353 | A1 | 7/2006 | Yue et al. |
| 2006/0155529 | A1 | 7/2006 | Ludviksson et al. |
| 2006/0206794 | A1 | 9/2006 | Ornstein et al. |
| 2008/0021923 | A1 | 1/2008 | Sedky et al. |
| 2008/0043286 | A1* | 2/2008 | Yoshida et al. ............. 358/1.15 |

OTHER PUBLICATIONS

"Adobe Photoshop Release history", Wikipedia, Oct. 28, 2008, pp. 1-7.
Akerlof, "The Market for "Lemons": Quality Uncertainty and the Market Mechanism", Quarterly Journal of Economics, vol. 84, Issue 3, Aug. 1970, pp. 488-500.
"Apache Server Frequently Asked Questions", Apache HTTP Server Version 1.3, retrieved on Apr. 19, 2004 at <<http://httpd.apache.org/docs/misc/FAQ.html>> , 35 pages.
Ashcraft, et al., "SPOOLES: An Object-Oriented Sparse Matrix Library", retrieved on Jan. 21, 2009 at <<http://citeseerx.ist.psu.edu/viewdoc/summary?doi=10.1.1.44.5809>>, Proceedings of the 9th SIAM Conference on Parallel Processing for Scientific Computing, pp. 1-10.
Bluethman, et al., "Interleaved Graphics and Text", IBM Technical Bulletin, vol. 22, No. 4, Apr. 1980, pp. 4813-4815.
Chien, et al., "Efficient Schemes for Managing Multiversion XML Documents", University of California, California, The VLDB Journal, Dec. 19, 2002, pp. 332-353.
Christodoulakis, et al., "Multimedia Document Presentation, Information Extraction, and Document Formation in MINOS: A Model and a System", ACM Transactions on Office Information Systems, vol. 4, No. 4, Oct. 1986, pp. 345-383.
"Controlling the Data Chaos by Adding Intelligence to Media", Adobe Systems, 2004, 4 pages.
Devanur, et al., "An Improved Approximation Scheme for Computing Arrow-Debreu Prices for the Linear Case", retrieved on Nov. 10, 2008 at <<http://www.cc.gatech.edu/~nikhil/pubs/fsttcs.pdf>>, 2003, pp. 1-8.
El-Kwae, et al., "Document Image Representation Using XML Technologies", Proceedings of SPIE, vol. 4670, 2002, pp. 109-120.
Ellis, "Postscript, Bezler Curves and Chinese Characters", ACM, 1989, pp. 162-165.
Geanakoplos, "The Arrow-Debreu Model of General Equilibrium", retrieved on Nov. 10, 2008 at <<cowles.econ.yale.edu, Cowles Foundation for Research in Economics at Yale University, 2004, pp. 116-124.
Girardot, et al., "Efficient Representation and Streaming XML Content Over the Internet Medium", IEEE 2000, pp. 67-70.
Han, et al., "WebSplitter:A Unified XML Framework for Multi-Device Collaborative Web Browsing" IBM Thomas J. Watson Research Center, Hawthorne, NY, CSCW, Dec. 2-6, 2000, ACM, pp. 221-230.
Hardy, et al., "Mapping and Displaying Structural Transformations between XML and PDF", ACM, 2002, pp. 95-102.
Holman, "What is XSL-FO?", xml.com, Google Mar. 20, 2002, pp. 1-4.
Jacobs, et al., "Adaptive Grid-Based Document Layout", ACM, 2003, pp. 838-847.
Jain, "A Polynomial Time Algorithm for Computing an Arrow-Debreu Market Equilibrium for Linear Utilities", Proceedings of the 45th Annual IEEE Symposium on Foundations of Computer Science (FOCS '04), IEEE, 2004, pp. 1-9.
Jain, et al., "Approximating Market Equilibria", Springerlink, LNCS 2764, 2003, pp. 98-108.
Levy, et al., "Non-Distorted Texture Mapping for Sheared Triangulated Meshes", The 25th Conference on Computer Graphics and Interactive Techniques, ACM, 1998, pp. 343-352.
Marco, et al., "A Framework for Designing and Implementing the Ada Standard Container Library", ACM 2003, pp. 49-61.
Miller, "An Introduction to the Resource Description Framework", D-Lib Magazine, available at <<http://www.dlib.org/dlib/may98/miller/05miller.html>>, May 1998, 10 pages.
Moschini, "@tryinCSS3 (was: Useragent Rules in CSS)", available at <<http://lists.w3.org/Archives/Public/www-style/2004Mar/0333.html>>, Mar. 31, 2004, 2 pages.
"Networked File System", retrieved on Apr. 19, 2004 at <<http://www.scit.wlv.ac.uk/~jphb/comms/nfs.html>>, 6 pages.
Open eBook Publication Structure 1.2, Open eBook Forum, Aug. 2002, pp. 1-93.
Orchard, et al., "Versioning XML Languages W3C Proposed TAG finding [Editorial Draft]", available at <<http://www.w3.org12001/tag/doc/versioning-20031116>>, Nov. 16, 2003, pp. 1-23.
Orchard, "Versioning XML Vocabularies", published on XML.com, Dec. 3, 2003, pp. 1-10.
Pawson, "Printing from XML: An Introduction to XSL-FO", xml.com, Google, Oct. 9, 2002, pp. 1-4.
Peters et al.,"CrystalWeb—A distributed authoring environment for the World-Wide Web" Computer Networks and ISDN Systems, North Holland Publishing, Amsterdam, NL. vol. 27, No. 6, Apr. 1995, pp. 861-870.
Reguero, et al., "Large Scale Print Spool Service", retrieved on Jan. 21, 2009 at <<http://citeseerx.ist.psu.edu/viewdoc/summary?doi=10.1.1.107.7406>>, Proceedings of the Twelfth Systems Administration Conference (LISA 1998), Boston, Massachusetts, Dec. 6-11, 1998, pp. 229-242.

Shade, et al., "Layered Depth Images", The 25th Annual Conference on Computer Graphics and Interactive Techniques, ACM, 1998, pp. 231-242.

"SOAP Version 1.2 Part 1: Messaging Framework", W3C Proposed Recommendation, available at <<http://www.w3.org/TR/2003/PR-soap12-part1-20030507>>, May 7, 2003, 49 pages.

"Supported File Formats Photoshop Elements 5.0", retrieved at <<http://www.adobe.com/cfusion/knowledgebase/index.cfm?id=330350>>, Adobe, Sep. 5, 2007, pp. 1-6.

"SVG Print", W3C Working Draft, available at <<http://www.w3.org/TR/2003/WD-SVGPrint-20030715/>>, Jul. 15, 2003 pp. 1-14.

"URIQA! The URI Query Agent Model, A Semantic Web Enabler", URIQA: The Nokia Query Agent, available at <<http://sw.nokia.com/uriqa/URIQA.html>>, 2004, 9 pages.

"Windows NT 4.0", Wikipedia, Nov. 6, 2008, pp. 1-9.

"Windows NT Server Printing", retrieved on Nov. 17, 2008 at <<http://www.microsoft.com/resources/documentation/windowsnt/4/server/reskit/en-us/resg...>>, 2008, pp. 1-35.

"XMP Adding Intelligence to Media", Adobe, XMP Specification, Jan. 2004, 11 pages.

Kanzaki, "RSS—Summary and Release of Site Information," retrieved on Feb. 17, 2010 from <<http://web.archive.org/web/20040408231744/http://www.kanzaki.com/docs/sw/rss.html>>, Mar. 2, 2004.

Sun Microsystems, "JAR File Specification", retrieved on Feb. 17, 2010 at <<http://java.sun.com/j2se/1.5.0/docs/guide/jar/jar.html>>, 2003.

Eisenberg, et al., "Consensus of Subjective Probabilities: The Pari-Mutuel Method", Annals of Mathematical Statistics, 1959, pp. 165-168.

The Supplementary European Search Report mailed Jul. 14, 2011 for European Patent Application No. 04779161.1, 4 pages.

Ide, et al., "Outline of the International Standard Linguistic Annotation Framework", Proceedings of the ACL 2003 workshop on Linguistic Annotation, retrieved on Jun. 28, 2011 at <<http://portal.acm.org/citation.cfm?id=1119297>>, Jul. 2003, 5 pages.

Poesio Massimo, "Coreference", MATE Dialogue Annotation Guidelines, retrieved on Jun. 28, 2011at <<http://www.ims.uni-stuttgart.de/projekte/mate/mdag>>, Jan. 2000, 58 pages.

Tei Consortium, "TEI: P4 Guidelines (Cover Sheet)", retrieved on Jun. 24, 2011 at <<http://www.tei-c.org/Guidelines/P4/>>, Mar. 2002, 198 pages.

TEI Consortium, "Text Encoding Initiative", retrieved on Jun. 21, 2011 at <<http://www.tei-c.org/Guidelines/P4/pdf>>, Mar. 2002, 1 page.

Office Action for U.S. Appl. No. 10/938,476, mailed on Jun. 20, 2011, Khaled S. Sedky, "Spooling Strategies Using Structured Job Information", 19 pages.

Office Action for U.S. Appl. No. 12/402,319, mailed on May 13, 2011, Khaled S. Sedky, "Spooling Strategies Using Structured Job Information", 7 pages.

* cited by examiner

PLANAR MAPPING OF GRAPHICAL ELEMENTS

RELATED APPLICATIONS

This application is a continuation application of, and claims priority to, copending U.S. nonprovisional patent application Ser. No. 10/935,025, filed on Sep. 7, 2004, entitled "Planar Mapping of Graphical Elements" to inventors Foehr, et al. This application also incorporates by reference the entire disclosure of each of the following U.S. Provisional Patent Applications, and claims priority under 35 U.S.C. §119(e) to the following U.S. Provisional Patent Applications, each of which was filed on May 3, 2004:

Ser. No. 60/567,679, entitled "Systems and Methods for Passing Data in a Filter Pipeline" to inventors Foehr et al.

Ser. No. 60/567,663, entitled "Systems and Methods for Handling a File with Complex Elements" to inventors Foehr et al.

Ser. No. 60/567,890, entitled "Systems and Methods for Support of Various Computer and Printer Capabilities" to inventors Foehr et al.

Ser. No. 60/567,920, entitled "Spooling Strategies Using Structured Job Information" to inventors Sedky and Emerson et al.

Ser. No. 60/567,830, entitled "Planar Rendering" to inventors Foehr et al.

Ser. No. 60/568,071, entitled "Sharing of Downloaded Resources" to inventors Foehr et al.

This application also incorporates by reference the entire disclosure of co-pending U.S. nonprovisional patent application Ser. No. 10/794,669, filed on Apr. 30, 2004, entitled "Document Mark Up Methods and Systems" to inventors Emerson et al.

TECHNICAL FIELD

The present invention generally relates to computing and rendering devices, and more particularly relates to systems and methods that provide planar mapping of graphical elements.

BACKGROUND

A variety of rendering devices may be communicatively coupled to a computing device to provide an output for a user. For example, a computing device configured as a desktop personal computer (PC) may include a display device (e.g., a monitor) that provides an output for viewing by the user and a printer for printing images to a printable medium which may then be viewed by the user. Each rendering device, however, may support different rendering functionality, one to another, such that one provides an output that cannot be rendered as intended by utilizing another.

A graphics environment for output on a display device, for instance, may support a concept known as transparency. Transparency is used to provide a visual effect in which a graphical element that is rendered using the effect may appear to be transparent or translucent to varying degrees. For instance, a translucent object, when displayed, enables any underlying object and/or background to be seen through the translucent object to varying degrees depending on an amount of transparency that is specified for the translucent object.

Traditional printers, however, do not support transparency. For instance, for each graphical element that is to be printed to a page utilizing a traditional printer, there are a variety of different scenarios that can be encountered. In a first scenario, a pixel of the graphical element is to be drawn to a location which does not already contain a pixel. In this scenario, the pixel does not affect any other pixel and therefore can be drawn to the location. In a second scenario, a new pixel is to be drawn to a location having a preexisting pixel. In this scenario, however, traditional printing devices merely overwrite the preexisting pixel using the new pixel. Therefore, when a new graphical element that contains the new pixel is printed using a traditional printer in the second scenario, the new graphical element opaquely covers any preexisting graphical element that was previously provided for output at that location.

In a third scenario, portions of an output file that contain translucent and overlapping graphical elements for output are rasterized to form a rasterized image, such as a bitmap. A raster is a grid of individual coordinates that is used to specify a location of each individual pixel in a display. A raster image identifies each of the coordinates in the raster and a corresponding color value. Rasterizing a portion of the image file, however, introduces resolution dependency. For example, to display the rasterized image as intended, a printer should have a resolution that generally corresponds to the resolution of the rasterized image. Additionally, because each individual pixel is mapped in a rasterized image, the amount of memory used to store a raster image generally consumes more memory resources than a vector image. Vector images are created through a sequence of mathematical statements that may be utilized to place vector shapes in a two-dimensional space. Therefore, instead of using a storage location for each pixel of a line drawing, a vector image describes a series of points to be connected.

Accordingly, there is a continuing need for planar rendering such that transparency functionality may be provided in a memory efficient manner using traditional printers that would not otherwise support transparency.

SUMMARY

Planar mapping of graphical elements is described. Content with translucent graphical elements is converted into visually equivalent content that avoids using transparency functionality, thereby enabling graphical environments that do not support transparency functionality to output the content as intended. Additionally, rasterization of the translucent graphical elements may be avoided, thereby conserving memory resources.

In an implementation, a method includes approximating a shape that corresponds to an overlapping portion of at least one graphical element that is translucent with another graphical element. A color is computed for the approximated shape from respective colors of each of the graphical elements and the translucence of the at least one graphical element. The approximated shape having the computed color is formed into a communication for output to a printer.

BRIEF DESCRIPTION OF THE DRAWINGS

The same numbers are used throughout the disclosure and figures to reference like components and features.

DETAILED DESCRIPTION

Overview

Figure 1:
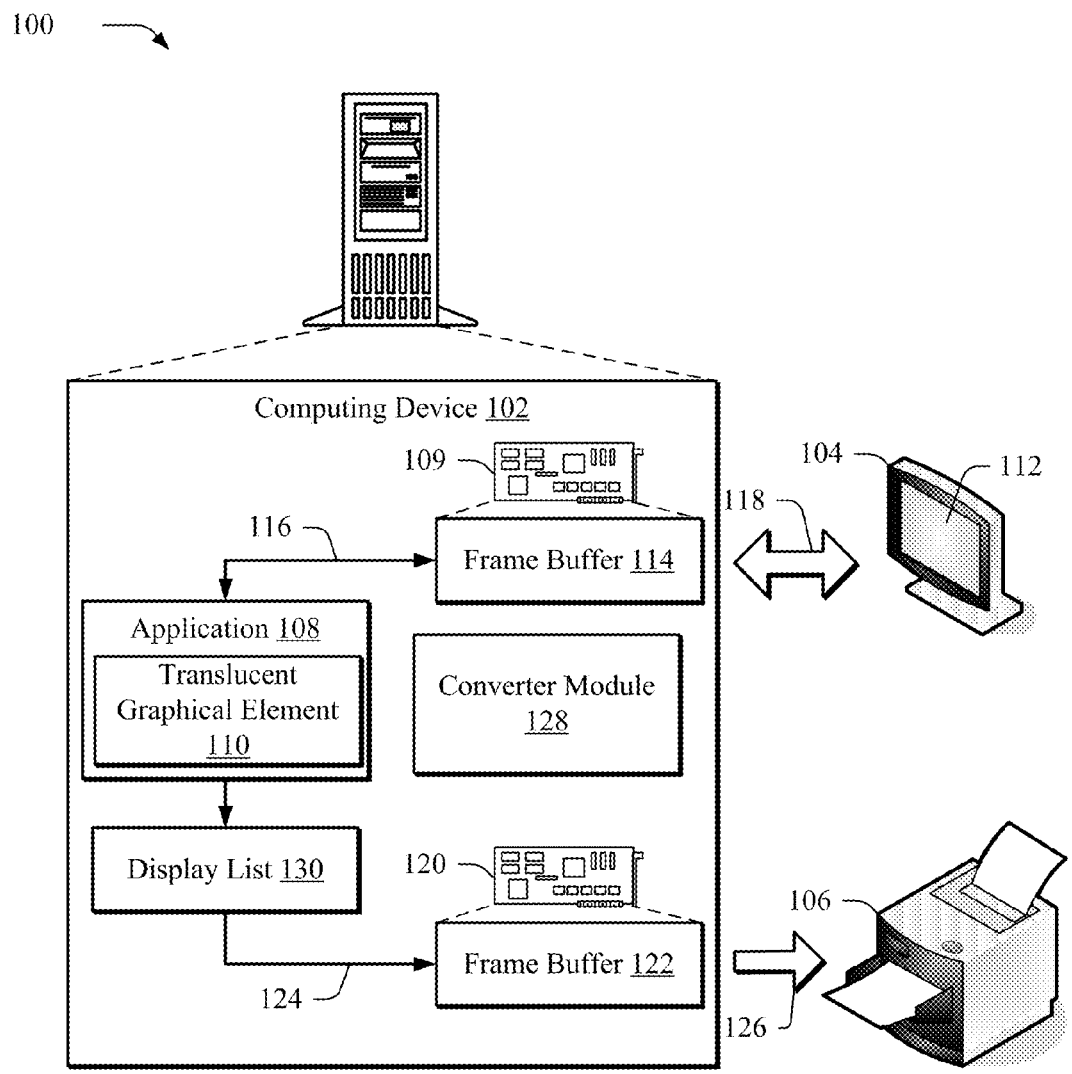
FIG. 1 is an illustration of an environment in an exemplary implementation in which planar rendering may be provided.

FIG. 1 is an illustration of an environment 100 in an exemplary implementation in which planar rendering may be provided. Graphics environments may support a technique known as transparency (i.e., transparency functionality) to achieve a visual effect where a graphical element that is rendered using transparency may appear to be transparent or translucent to varying degrees. Therefore, as used in the following discussion, a rendering of a graphical element using the transparency techniques described herein may relate to a graphical element that is transparent or translucent.

Transparency may be specified a graphical image using a special encoding of color values of elements and their constituting pixels. In addition to the standard color channels, such as Red, Green and Blue (RGB) or Cyan, Magenta, Yellow and Black (CMYK), there is an additional channel called an "alpha channel". The value of this alpha channel (i.e., the alpha value), for instance, can range from 0.0 to 1.0 (or 0 to 255, depending on the range of values used). The alpha value of 0.0 (or 0) is generally utilized to represent a fully transparent pixel, and the alpha value of 1.0 (or 255) is generally utilized to represent a fully opaque pixel.

The environment 100 of FIG. 1 is illustrated as including a computing device 102 and a plurality of target entities, one of which is illustrated as a display device 104 and another one of which is illustrated as a printer 106. The computing device 102 includes an application 108 which is executable thereon to provide and/or request a translucent graphical element 110. When the translucent graphical element 110 is rendered, its corresponding color channels (e.g., RGB or CMYK) are blended with the color channels of any other graphical element it overlaps that has already been rendered. In an implementation, alpha blending operates on pixels already provided for output to the destination surface and does not differentiate between pixels based on the originating graphical element that contains the pixels.

A video adapter 109, for instance, may be provided for processing the translucent graphical element 110 for display on a screen 112 of the display device 104. The video adapter 109 includes a frame buffer 114 that stores graphical elements for output to the display device 104 and for display on the screen 112. In this instance, however, the alpha blending operation utilizes read access to the frame buffer 114 or destination surface (e.g., the screen 112) in order to read back each preexisting pixel's value(s), such as color and alpha values. Read and write access is illustrated between the application 108, the frame buffer 114, and the display device 104 through the use of double-ended arrows 116, 118.

While read access to the frame buffer 114 is provided for some target entities (e.g., the video adapter 109, software rasterizers, and so on), read access is not typically available for printers. For example, the computing device 102 may include a printer adapter 120 that is configured to process the translucent graphical element 110 for output to the printer 106. Once the commands to process the translucent graphical element 110 have been sent to the printer 106 (e.g. by a driver), its internal state changes, the application 108 or other software executing on the computing device 102 may not be able to determine a new device state. Thus, the output from the application 108 may be unidirectional through the printer adapter 120 to the printer 106 even though the printer adapter 120 may also include a frame buffer 122. The absence of read access is illustrated between the application 108, printer adapter 120, and printer 106 through the use of single-ended arrows 124, 126.

Page description languages (PDLs) that do not allow specification of alpha values require special treatment of transparent and translucent objects. A PDL may be thought of as a command set used to transmit graphical elements (along with their positions and attributes) to a printer. One method is rasterization of the transparent content. Rasterization, as previously described, is generally considered undesirable because of the significant memory resources utilized to store rasterized portions of an image.

Planar rendering is described which, in an implementation, limits and/or avoids rasterization of portions of an image. Instead, planar rendering may be utilized to retain an elemental nature of the content and record each graphical element in a display list that is used track of the area covered by each graphical element and its relative z order position, one to another. When the transparent graphical element 110 is to be rendered, for instance, a converter module 128 may be executed to find overlapping areas of the translucent graphical element with any previous graphical elements recorded in a display list 130. In a second step, the translucent graphical element 110 is added to the display list 130 with its color computed as if it was transparently printed on a printable medium, such as a white surface for white paper. In subsequent steps, the effective color of each previously determined overlapping area is computed according to one or more transparency blending (e.g., alpha blending) algorithms. In a last step, a new graphical element is generated for each overlapping area and recorded in the display list 130 (together with the computed effective color values), according to the z order of the graphical elements. This results in a display list 130 that provides a planar map of graphical elements, where each graphical element has a deterministic color that is independent from any previously included graphical element. This display list 130 can then be translated into PDL commands using a printer driver for output to the printer 106.

The following discussion is arranged into a plurality of sections. A first section provides a glossary of terms as utilized in instances of this document. A second section describes an exemplary system for producing and consuming structured job information that can contain graphical elements that utilize transparency functionality. A third section includes illustrations and flow charts describing exemplary procedures which may be implemented utilizing the exemplary system.

Glossary

The term "job" used herein refers to a task in which one or more actions are performed to process rendering information. For instance, a print job may entail printing job information that defines one or more documents. More generally, reference to "processing" job information can refer to any kind of rendering of such job information, such as printing or displaying such job information. Alternatively, processing can refer to distributing the job information to a target destination (with or without modifying it), archiving the job information, or some other form of processing. The term "job information" refers to any kind of information used to specify the nature of the job, such as the actual information to be rendered, and/or information that defines how the job is to be rendered, and so on.

A "package" is a logical concept that refers to a collection of job information that comprehensively specifies an entire job. The package can contain multiple "parts." A "payload" corresponds to a collection of parts treated as a single unit, and which satisfies certain characteristics. For instance, a package may specify multiple payloads that respectively define different renditions of a single document, and each of these payloads can contain multiple parts (e.g., image resources, font resources, and so forth).

The term "document" as used herein refers to any unit of any kind of information. For example, a document may pertain to information created by a text editing application, a spreadsheet processing program, a drawing program, and so on. Each document can have multiple associated parts, each of which can itself be considered a component document in its own right. A job can specify documents that originate from multiple different sources.

The term "spool storage" represents storage for storing job information implemented using any physical storage medium. In one case, a device may implement the spool storage using RAM memory. In another case, the device may implement the spool storage using disk storage, and so on. The spool storage may define a single file, a collection of associated files, or some other storage strategy. A unit of spool storage (such as a single file) that stores an entire package defining a job is also referred to as a "container." Alternatively, the spool storage can refer to transitory information transmitted via a communication channel and inherently stored on that channel during transport.

Generally, any of the functions described herein can be implemented using software, firmware (e.g., fixed logic circuitry), manual processing, or a combination of these implementations. The terms "module," "functionality," and "logic" as used herein generally represents software, firmware, or a combination of software and firmware. In the case of a software implementation, the module, functionality, or logic represents program code that performs specified tasks when executed on a processing device or devices (e.g., CPU or CPUs). The program code can be stored in one or more computer readable memory devices. The features of the planar rendering strategies described below are platform-independent, meaning that the planar rendering strategies may be implemented on a variety of commercial computing platforms having a variety of processors.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth.

Exemplary Environment

Figure 2:
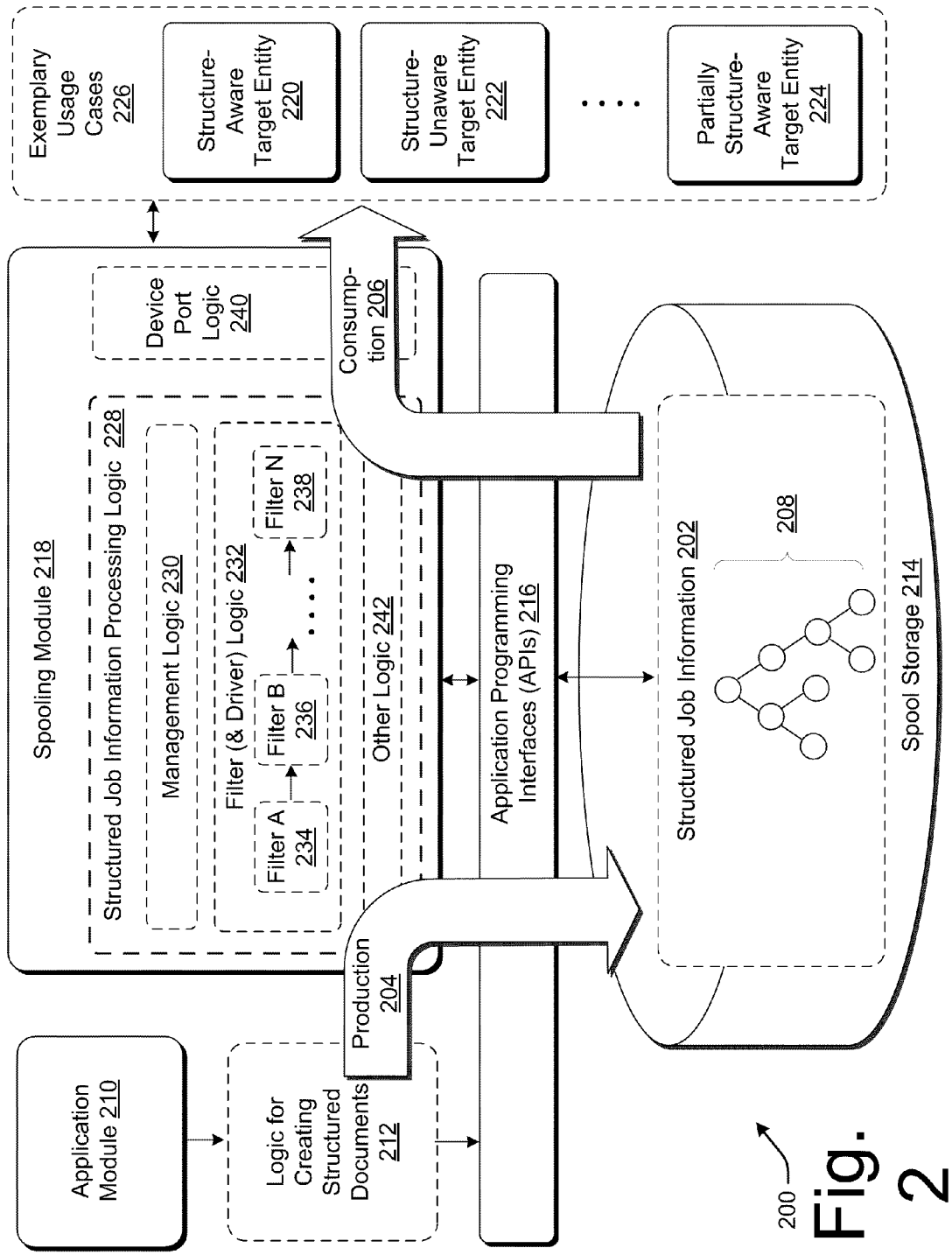
FIG. 2 shows an exemplary system for producing and consuming job information.

FIG. 2 shows an exemplary system 200 for producing and consuming job information 202. The production of such job information 202 is generally represented by arrow 204, and the consumption of such job information 202 is generally represented by arrow 206.

As broadly indicated in FIG. 2, the job information 202 includes a defined structure 208. The structure 208 generally includes a plurality of nodes that are connected together according to a set of established rules. The same general rules apply to the construction of the structure 208 regardless of the application and application platform used to generate the job information 202.

In the exemplary case of FIG. 2, the structure 208 uses a hierarchical scheme to connect the nodes together. A hierarchical scheme couples the nodes together using parent-child relationships. That is, a "top-most" node defines a so-called root node. Thus, the use of the terms "top" and "bottom" refer to placement in the hierarchical scheme relative to the root node. The root node includes one or more child nodes, and the child nodes, in turn, can include one or more of their own respective child nodes, and so on. If so configured, child nodes can generally inherit properties associated with their respective parent/ancestor nodes.

Generally, the structure 208 is a logical concept that may or may not map to actual parts of a document to be rendered. That is, each node may be considered an object. Certain objects may represent actual parts of a document to be rendered (such as various image resources and font resources). Other objects may not have a one-to-one relationship with parts of the documents to be rendered. These latter types of nodes are therefore analogous to folders in a file hierarchy; that is, the folders may store individual files that contain content that maps to actual parts of the document, but the folders themselves may not have a one-to-one relationship with actual parts of the document.

The production and consumption aspects (204, 206) of the processing of job information 202 will be addressed separately below. First, by way of overview, the system 200 includes an application module 210 and conversion logic 212 coupled to a spool storage 214 via application programming interfaces (APIs) 216. The spool storage 214 stores the job information 202. This chain of components implements the production aspects (204) of the processing of the job information 202. The system 200 also includes a spooling module 218 that is configured to retrieve the job information 202 from the spool storage 214 and then perform some kind of processing on it to provide an output result. This chain of components implements the consumption (206) aspects of the processing of the job information 202. As noted above, processing can refer to any kind of action performed on the job information 202, which may or may not modify the content of the job information 202. The processing may comprise printing the job information 202, displaying the job information 202, routing the job information 202 to a target location (with or without modifying it), archiving the job information 202, and so on. In any case, the recipient of the output result generated by the spooling module 218 can include one or more of the target entities (220, 222, . . . , 224) associated with different usage cases 226. A variety of the usage cases 226 will be discussed below.

The modules, logic and storage units shown in the system 200 can be implemented by any variety and grouping of physical mechanisms and devices. In one exemplary case, a computing device (not shown here) executes the application module 210, the conversion logic 212, the APIs 216, the spool storage 214 and the spooling module 218. More specifically, the various logic and modules (210, 212, 216, 218) can be implemented by machine readable code that is storable in the memory of the computing device and executed by a processing unit(s) of a computing device. The spool storage 214 can be implemented by a storage medium (e.g., hard disk) provided by the computing device. The computing device can operate using any kind of platform (e.g., as defined by the operating system and/or other software configuration of the computing device). In other words, in one implementation, the functionality and associated formats to be described below are specifically configured to operate on different computing platforms, thus defining a standard approach that has wide applicability to different technical environments and which thus serves to facilitate interaction among different technical environments and associated users.

In one case, the target entities (220, 222, . . . , 224) can be implemented as devices which are separate from the computing device which implements the other components (210-218) of the system 200. The computing device can be communicatively coupled to the target entities (220, 222, . . . , 224) via any kind of communication channel, such as a USB coupling, a parallel coupling, a removable media coupling, a network coupling of any kind, and so forth. In a common case, for instance, one or more of the target entities (220, 222, . . . , 224) are configured as rendering devices for rendering documents, such as printers for printing documents that are provided by the spooling module 218. The computing device can be communicatively coupled to the printer(s) via any kind of hardwired and/or wireless links using any kind of communication protocol. The target entities (220, 222, . . . , 224) can alternatively represent display devices, storage devices, other computing devices, and so on.

The above allocation of system 200 functions to particular devices is only exemplary. In other implementations, different aspects of the system 200 can be implemented by separate computing devices. For instance, a first computing device can implement the application module 210 and a separate computing device can implement the spooling module 218. In other implementations, the spool storage 214 can also be implemented as a separate unit which couples to the computing device which implements the application module 210 and/or the spooling module 218. In other implementations, the target entities (220, 222, . . . , 224) can be integrated into the same computing device which implements the application module 210 and/or the spool module 218. Still other configurations are possible, examples of which are illustrated throughout the present description.

In any event, where one or more computing devices are used to perform aspects of the system 200, those computing devices can correspond to any type of computing devices, such as general purpose computing devices (e.g., desktop PCs), application-specific computing devices (e.g., game consoles), portable computing devices (e.g., personal digital assistants and mobile phones), and so on.

Further details regarding each of the above-identified components of the system 200 will follow. Beginning with the production aspect (204) of the system 200, the system 200 can use any kind of application module 210 to generate any kind of job information 202, typically associated with any kind of document. Common types of application modules 210 include text processing programs, spreadsheet processing programs, graphics processing programs, markup language processing programs, database search and retrieval programs, and so on. There is no constraint on the type of application program that can be used to supply job information 202 to be processed using the system 200.

Conversion logic 212, in association with APIs 216, ensures that the job information sent to the spooler storage 214 has the required structure 208. In one case, the application module 210 can itself supply the conversion logic 212 as part of its tools. In another case, the system 200 may employ a separate module to implement the conversion logic 212. In this case, different commercial providers can supply the application module 210 and the conversion logic 212. The specific nature of the transformations performed by the conversion logic 212 is dictated by the prescribed format of the structure 208. The forthcoming explanation of the format of the structure 208 will also provide detail regarding the nature of the transformation performed by the conversion logic 212 (if, in fact, any transformation is required). Alternatively, or in addition, the spooling module 218 can play a role in the generation of the job information 202 having the required structure 208.

APIs 216 define one or more interfaces for facilitating interaction among the components shown in the system 200. For example, the APIs 216 facilitate the storage of job information 202 in the spool storage 214 and the subsequent retrieval of the job information 202 from the spool storage 214. More specifically, exemplary and non-limiting functions performed by the APIs 214 can include: (1) submitting job information 202 to the spooling module 218 for scheduling and printing; (2) querying the state of the job while in the spooling module 218; (3) monitoring different stages of the job production and hooking up to back end notifications to inform any interested listening entities; (4) monitoring different stages of the job consumption and hooking up to back end notifications to inform any interested listening entities; (5) enabling the spooling module 218 to send output data to the target entities (220, 222, 224), and so on. Job information can be supplied to and retrieved from the spool storage 214 in a number of different modes, such as, for example, a streaming mode. In a streaming mode, portions of the job information are stored or processed in piecemeal fashion as it is being received.

The APIs 216 can generally be implemented as a plurality of methods and properties. In the context of an object-oriented programming paradigm, the APIs 216 can be defined by a collection of classes which specify such methods and properties.

With respect to the consumption (206) aspect of the system 200, the system 200 retrieves the resource information 202 from the spool storage 214 and supplies it to the spooling module 218 for processing. The spooling module 218 can represent a software program implemented by the same computing device that provides the application module 210. It includes processing logic 228 for processing the job information 202. This processing logic 228, in turn, can include management logic 230 for governing various operations performed by the processing logic 228.

The processing logic 228 can also include filter logic 232 for actually performing the required processing on the job information 202. In an implementation, the processing logic 228 corresponds to the converter module 128 of FIG. 1 and the filter logic 232 corresponds to the filter pipeline 102 of FIG. 1. As will be described in greater detail below in relation to FIG. 5, the filter logic 232 (e.g., filter pipeline 102) can include one or more filters (234, 236, . . . , 238) for performing different processing functions on the job information 202 to generate an output result. The spooling module 218 then feeds the final output result to one or more of the target entities (220, 222, . . . , 224) via a device port 240. In the common case of printing, one or more of the target entities (220, 222, . . . , 224) include a printer which receives the output result and prints the document(s) specified by the output result. Finally, the spooling module 218 can also include generically-labeled other logic 242 for performing other related and unrelated functions.

Further details regarding the filter logic 232 are provided as follows. In one implementation, the job information 202 that is processed by one or more of the filters (234, 236, . . . 238) has the same format structure 208 as the job information 202 stored in the spool storage 214. Thus, in this exemplary implementation, the filter logic 232 does not require that the job information 202 be converted into an intermediary form in order to process it. This, in turn, enables the spooling module 218 to process job information 202 in a more efficient manner compared to those techniques that require such conversion. This also yields a more uniform approach compared to some other techniques, which may resort to a complicated assortment of disparate and ad hoc processing techniques to deal with different proprietary formats that can be used to store job information in the spooler storage 214.

The functions performed by the individual filters (234, 236, . . . , 238) can be generalized in the following manner. A first class of filters accepts job information 202 which conforms to the structure 208, performs some kind of processing on this information 202 (which may or may not modify the information 202), and then generates an output result which also conforms to the structure 208. A second class of filters accepts job information 202 which conforms to the structure 208, performs some kind of processing on this information 202, and then generates an output result which does not conform to the structure 208 (or which only partially conforms to the structure 208). A third class of filters accepts job information 202 which has already been converted into a non-structured format, and provides yet further modification or processing of such non-structured information.

More specifically, for example, one or more initial filters of the first class can be set up to modify the job information 202 in various ways (e.g., by adding a watermark, and so on), but do not otherwise change its basic format structure 208. A terminal filter of the second class can be set up to modify the job information 202 by changing its format, such as by either completely removing its format structure 208 or at least partially modifying its format structure 208. More specifically, the terminal filter (e.g., filter n 238) can be used to convert job information 202 having the format structure 208 into a non-structured form that can be interpreted by an identified target entity (220, 222, . . . , 224). In effect, the filters (234-238), when taken together, thus serve the role of a printer driver. For instance, filter n 238 may convert the job information 202 having the structure 208 into a print description language (PDL) format that can be fed to a printer which accepts such format.

Suppose, as explained above, that the terminal filter n 238 is a filter of the first class which generates an output result having job information 202 which still conforms to the structure 208. A target entity 220 represents an appropriate device to receive such an output result. This target entity 220 is referred to as "structure-aware" because it receives job information 202 conforming to the structure 208 and thus includes processing functioning to recognize such information 202 and process it appropriately.

Suppose, alternatively, that the terminal filter n 238 is a filter of the second class or third class which generates job information which no longer conforms to the structure 208. A target entity 222 represents an appropriate entity to receive such an output result. This target entity 222 is referred to as "structure-unaware" because it receives job information 202 that no longer conforms to the structure 208, and thus the entity 222 does not need to devote any specialized functionality for processing information expressed in this structure 208; indeed, the target entity 222 need not, and generally will not, be aware that the job information 202 its receives (e.g., in an appropriate PDL format) was ever originally expressed using the structure 208.

There is a third case where the terminal filter n 238 generates an output result which modifies the structured format 208 to some extent, but still maintains some vestiges of the structure 208. Target entity 224 is an example of a kind of entity that can receive and processing this output result. FIG. 2 identifies this kind of entity 224 as being "partially structure-aware" because it should include at least some processing functionality for interpreting whatever remnants of the structure 208 that still remain in the output result.

Different jobs may require that different filtering operations be performed on the associated job information 202. The filter logic 232 (e.g., the converter module 128 of FIG. 1) can be used to define what filters (234, 236, . . . , 238) are to be invoked in processing a particular job, how the individuals filters (234, 236, . . . , 238) are to be configured, and how the filters (234, 236, . . . , 238) are to be chained together. In other words, the filter logic 232 can select and chain the filters (234, 236, . . . , 238) together in different ways to produce different net effects. In a series configuration shown in FIG. 2, for example, filter a 234 feeds its output result into the input of filter b 236, and filter b 236 feeds its output result into to the input of another filter, and so on.

More specifically, the type of processing that the filter logic 232 performs on the job information 202 can be controlled, in part, by one or more "print tickets" associated with the job information 202. The print tickets include attribute information that defines the operations that should be performed on the job information 202 as it passes through the filter logic 232. Different print tickets can be associated with different parts of the structure 208 of the job information 202. For instance, a print ticket can be associated with the root of the structure 208, so as to globally apply print instructions to the entire job. A print ticket can be associated with another node farther down in the hierarchy of the structure 208 to apply more localized print instructions with respect to some part of the job. For example, this feature allows different processing rules to be assigned to two different pages of a single print job, or different parts of a single page, and so on.

Figure 3:
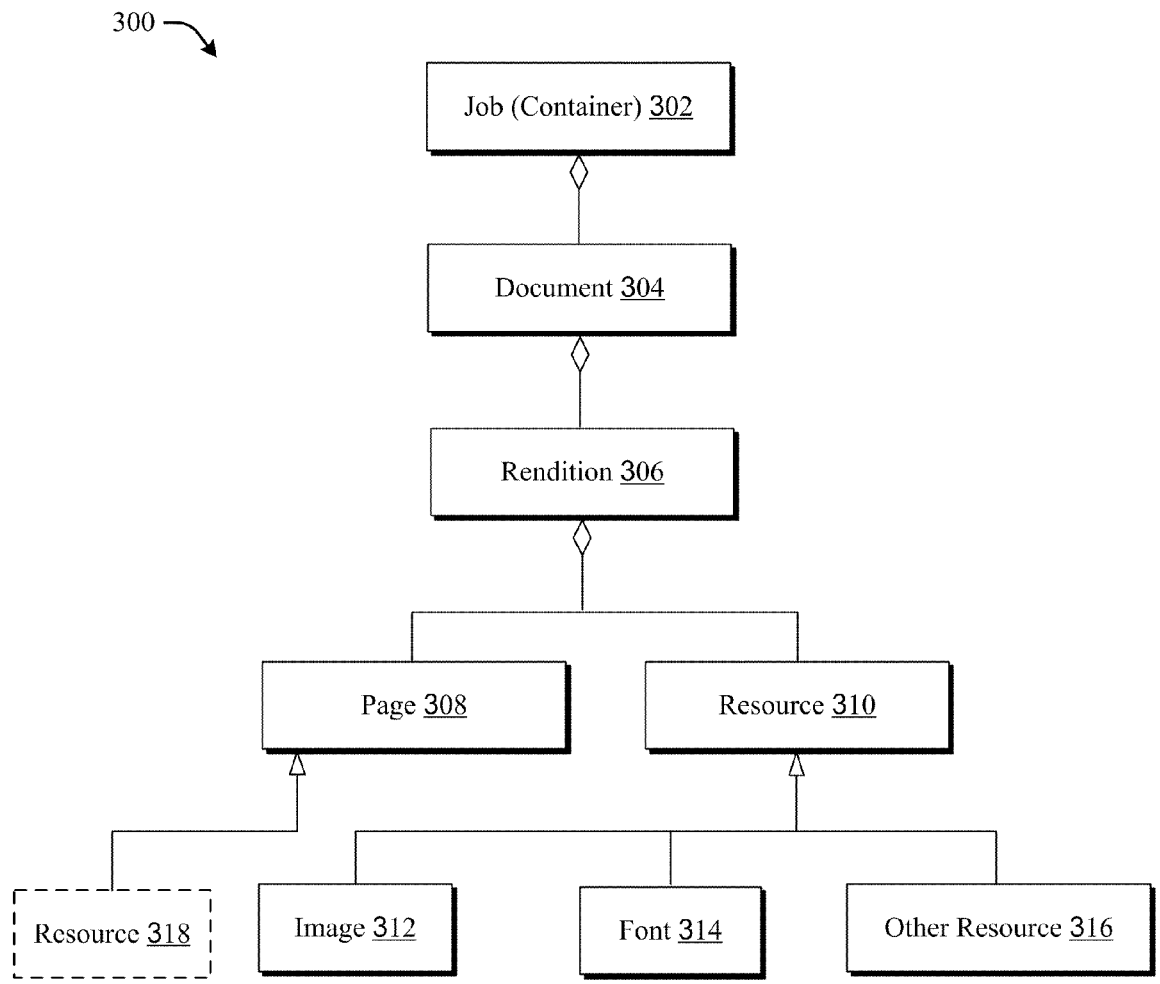
FIG. 3 shows an exemplary schema that can be used to form job information having a structure shown in FIG. 2.

FIG. 3 shows an exemplary schema 300 that can be used to form the job information 202 having the structure 208 shown in FIG. 2. The schema 300 defines a way of arranging job information 202 originally provided by the application module 210 (e.g., in the form of documents generated by the application module 210) into the hierarchical structure 208. As mentioned above, the conversion logic 212 in association with the APIs 216 can perform this conversion task, or the application module 210 itself can output job information 202 which is already persisted in the structured format 208. Or the spooling module 218 can also play a role in generating the required format structure 208.

The top level of the hierarchy specifies job-related information 302 that identifies the entire job itself. For instance, the job may pertain to the printing of a book including multiple chapters, and each chapter, in turn, can include multiple pages, and each page, in turn, can include font resources and image resources. In this example, the top level of the hierarchy identifies the logical package which encapsulates the entire job, that is, the entire book. The next level of the hierarchy specifies information 304 that identifies the documents associated with the job. In the example of the book, the document level might specify individual chapters in the book. Or this level of the hierarchy may specify different kinds of documents to be printed in a single print job, such a first document created using a text editor, and a second document created using a spreadsheet program, and so on, where these two documents together form a report of some kind. The next level of the hierarchy specifies information 306 that identifies different renditions of the documents identified in the preceding level. For instance, consider the case of a chapter of a book. This chapter can be specified in a first rendition that requires that the chapter be printed in a black and white mode, and a second rendition that requires that the chapter be printed in a color mode. Or different renditions may correspond to different languages used to present information in the document, and so on. Depending on configuration information and other factors, the spooling module 218 or other processing logic can select an appropriate one of the renditions to process and present to an appropriate target entity (220, 222, . . . , 224). The next level of the hierarchy specifies information 308 that identifies different pages within the renditions of the documents identified in the proceeding level.

Resources can be associated with any level of the hierarchy defined by schema 300. For instance, exemplary resource 310 can be associated with the renditions level of the hierarchy. Such resource 310 can comprise an image resource 312, a font resource 314, or some other resource 316. Resource 318, on the other hand, is associated with the page level of the hierarchy, rather than rendition level. FIG. 3 is exemplary and non-limiting; for instance, resources can be associated with yet additional levels in the hierarchy, although not shown in FIG. 3.

Further, although not shown in FIG. 3, metadata can be associated with any of the levels of the hierarchy of the schema 300. Metadata specifies any supplemental information pertaining to the job information 202, such as an author who created a document contained in the job, a time when the document was created, and so on. There are no restrictions on the type of, and meaning assigned to, metadata that can be appended to different parts of the schema 300.

In the same manner, print tickets can be associated with any level of the hierarchy of the schema 300. Print tickets define the types of processing operations that should be performed on associated parts of the hierarchy. For instance, a print ticket associated with the job container level 302 will apply to the entirety of the package defined by the job information 202. A print ticket associated with an individual page of the job information 202 will have a localized effect by only affecting that page.

In general, if so configured, lower levels of the hierarchy defined by the schema 300 can inherent the properties defined in higher levels. In other words, if so configured, a child object in the hierarchy will inherit the properties defined for its parent and ancestors. This means that, if so configured, a print ticket, resource, or metadata associated with a parent node can also be, through inheritance, available to its associated child nodes.

In summary, the schema 300 shown in FIG. 3 provides a powerful, uniform and versatile mechanism for representing complex job information, particularly for those jobs that involve multiple documents and/or multiple renditions of documents. Traditional techniques provide no provisions for representing these kinds of complex scenarios in spool storage; therefore, these traditional techniques suffer from the inefficiencies described above, which can be significant.

Figure 4:
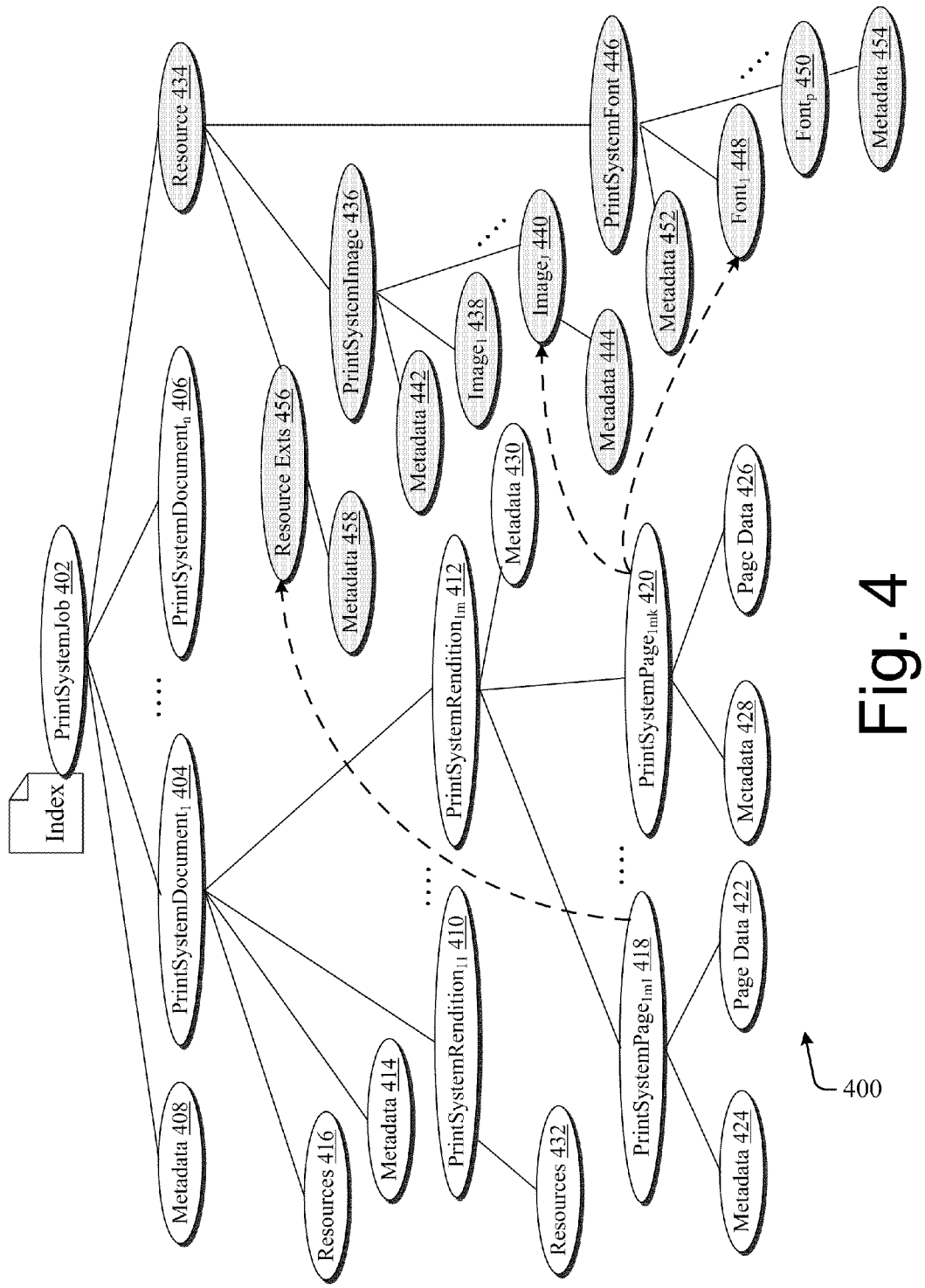
FIG. 4 shows an exemplary instantiation of the schema of FIG. 3.

To further clarify the exemplary schema 300, FIG. 4 shows one exemplary instantiation 400 of the schema 300. The entire collection of nodes shown in FIG. 4 defines a package. The package includes a root node 402 associated with the entire package, e.g., the entire job. An index can be associated with the package, and hence with the root node 402. This index can be used to locate the package in the spool storage 114.

The job defined by the root node 402 includes a number of documents, as identified by document node 404 and document node 406. Also, a metadata node 408 is associated with the root node 402. If so configured, the metadata associated with this metadata node 408 defines properties which apply to the job as a whole.

Each of the documents associated with nodes 404 and 406 can include multiple renditions associated therewith. For example, the document represented by node 404 includes at least two renditions identified by nodes 410 and 412. As explained in connection with FIG. 3, a document may allocate separate renditions for printing a document in black and white mode, color mode, and so on. No limitation is placed on what a developer may define as a rendition in the context of a particular application environment.

By virtue of the above-identified provisions, the job information 202 having the structure 208 serves as a general blueprint from which many renditions can be generated. In general, the specification of such rendition information within the spool storage 214 itself is a particularly unique and beneficial feature. For instance, this provides an efficient mechanism for printing different versions of the same document without having to store entire separately-tailored copies of the same document in the spool storage 214. Storing separate copies may overwhelm the storage and processing resources of the printing subsystem.

In addition to rendition nodes (410, 412), node 404 also includes nodes 414 and 416 associated therewith. Node 414 specifies metadata associated with node 404 and node 404 specifies a resource associated with node 404. A resource can include an image resource, a font resource, or some other resource that goes into the composition of the document represented by node 404.

Each rendition includes one or more pages associated therewith. Nodes 418 and 420, for example, represent pages associated with rendition node 412. Metadata node 430 indicates that metadata can be associated with the rendition level of the hierarchy (as it can for any level). Resource node 432 indicates that resource information can be associated with the rendition level (as it can for any level). An image may also include a hierarchical structure, further discussion of which may be found in relation to FIGS. 9 and 11.

Finally, each page can include page data associated therewith as well as metadata. For example, page node 418 includes page data node 422 and metadata node 424 associated therewith, indicating that page data and metadata can be associated with this page. Page node 420 includes page data node 426 and metadata node 428 associated therewith, indicating that page data and metadata can be associated with this page.

The package associated with root node 402 can also include a collection of resources for shared use by different nodes in the job. Such collection of resources thus defines a shared library of resources that can be applied at different points within a document represented by the package. Particular types of resources include image resources, as represented by general image node 436. Individual image nodes (438, 440) are children of the parent image node 436, and respectively represent individual image resources. A metadata node 442 depends from the general image node 436, which represents metadata that, if so configured, applies to all of the image resources. Another metadata node 444 depends from an individual image node 440, representing metadata that applies to only this image resource associated with this node 440.

The same structure applies to font resources. A general font node 446 represents the inclusion of a plurality of font resources to select from, indicated by font nodes 448 and 450. Metadata can be associated with the general font node 446, as indicated by metadata node 452, or can be associated with a particular font resource, as indicated by metadata node 454. If so configured, metadata associated with the general font node 446 applies to all font resources while metadata associated with a particular font resource (such as found resource 450) applies only to that particular font resource.

The resources can also include a number of other types of resources, as generally indicated by resource node 456. Metadata can be associated with this node 456, as indicated by metadata node 458.

Any document-related node in the package can reference any reference node, indicating that a particular part or aspect of the document is referencing a particular resource for use thereat. For instance, in the exemplary case of FIG. 4, page node 418 references resource extensions node 456. This association is indicated with a dashed line. This means that the resource represented by node 456 is used in the page represented by page 418. Further, page node 420 is associated with image node 440 and font node 448, indicting that an image resource associated with node 440 and a font resource associated with node 448 are used in the page associated with node 420. These associations are indicated by two respective dashed lines.

The hierarchies shown in FIGS. 3 and 4 can be created in different ways. The hierarchy itself is a logical entity, where the nodes correspond to respective objects. Objects can reference other objects in different ways. In one technique, the individual objects can be modified so that they point to linked objects. Linking can be provided by pointers, Uniform Resource Locators (URLs), or some other referencing mechanism. Alternatively, or in addition, separate relationship information can be defined that specifies how separate objects are linked together. This mechanism eliminates the need for individual objects to be modified to define their interrelationship to other objects. This separate relationship information thus serves a blueprint for linking together separate objects in the job information. Likewise, metadata can be associated with individual nodes in the hierarchical structure in different ways. For instance, individual nodes can provide linking information that points to associated metadata, or the objects themselves can embeds such metadata. The Extensible Markup Language (XML), or other markup language, can be used to create the structured format shown in FIGS. 3 and 4.

As noted above, the nodes shown in FIG. 4 are logical entities. Mapping rules define how the nodes map to actual physical entities used to constitute a document that is to be rendered. In one case, some of the nodes directly correspond to parts that are to be rendered, such as image resources and font resources. In another case, other of the nodes do not map, in one-to-one fashion, to actual renderable content of the document, but rather serve to communicate the organization of content in the document, or other aspect of the document.

Figure 5:
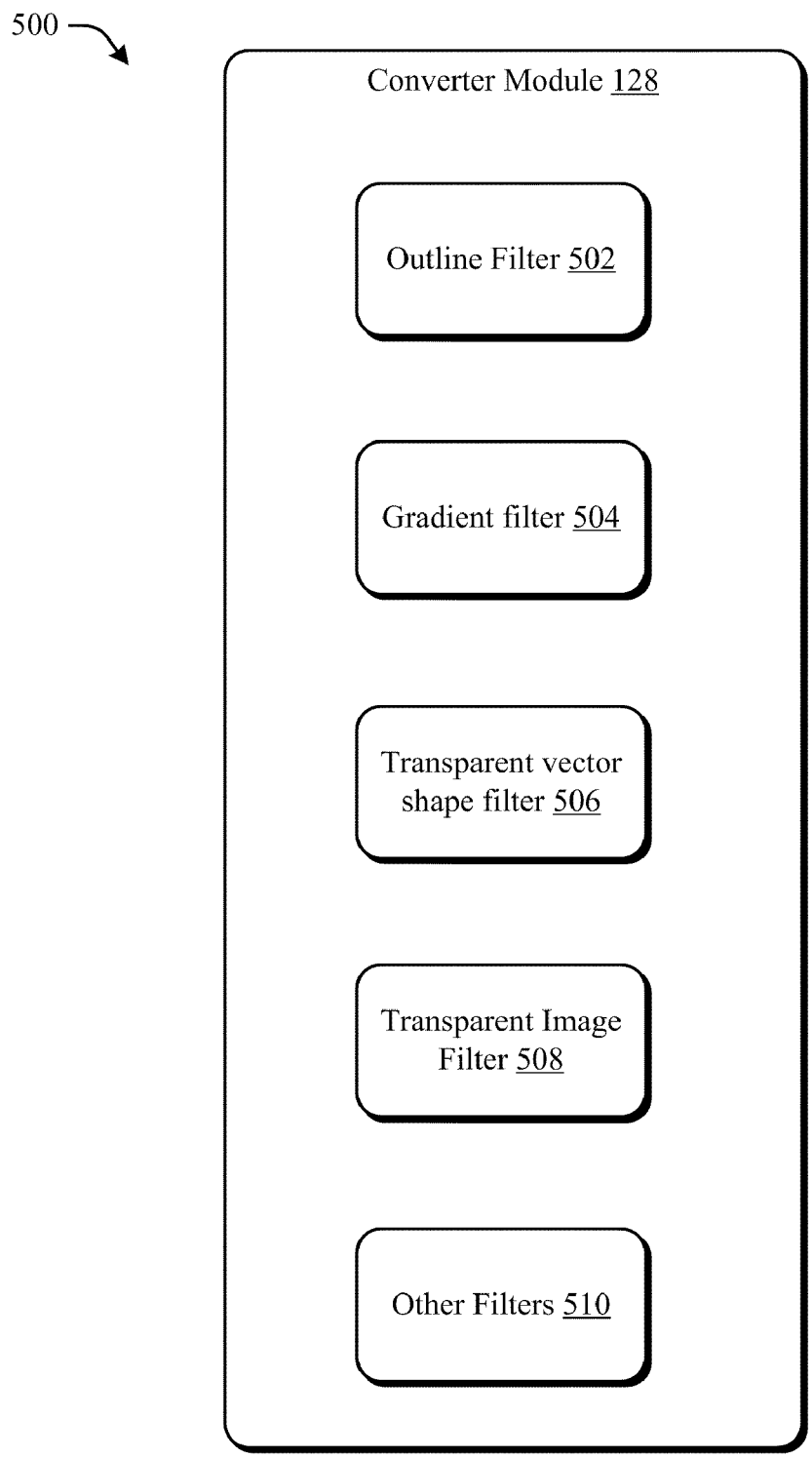
FIG. 5 is an illustration in an exemplary implementation showing a converter module of FIG. 1 in greater detail.

FIG. 5 is an illustration in an exemplary implementation showing the converter module 128 of FIG. 1 in greater detail. The converter module 128 includes a plurality of filters 504-512. A file package may include complex elements that cannot be readily printable by a legacy printer, such as a structure unaware target entity 222 of FIG. 2. The converter module 128 may be configured to process the file package and send data that is usable by a legacy printer to print the file.

The plurality of filters 502-510 of the converter module 128 are arranged to form a filter pipeline. Each of the filters 502-510, for instance, may be configured to convert complex elements in a file that cannot be effectively processed by a legacy printer into simpler elements that the printer can efficiently print. For example, outline filter 502 is configured to process elements with complex outlines. Outline filter 502 is executable to convert a complex outline of a graphical element into a simple primitive(s) that can be handled by a legacy printer. Simple primitives may include lines, polygons, areas, vector shape elements, and the like.

Gradient filter 504 is configured to process elements with complex gradients. Gradient filter 504, for instance, is executable to convert a complex gradient into multiple polygons with fill colors that approximate the gradient.

Transparent vector shape filter 506 is configured to process vector shape elements with transparency functionality. As previously described, a first graphical element that supports transparency functionality (e.g. alpha value less than one) allows a second graphical element that is overlapped by the first graphical element with transparency to be partially shown. The region of the second graphical element covered by the first graphical element (i.e. overlapping portion) may therefore have a color that is "between" the colors of the first and second graphical elements. For example, if the transparency value is high (i.e., an alpha value is set closer to 1.0 such that the graphical element is more opaque), the color of the overlapping portion will be closer to the color of the element with transparency (i.e., the first graphical element). If the transparency value is low (i.e., an alpha value is set closer to 0.0 such that the graphical element is more opaque), the color of the overlapped region will be closer to the color of the overlapped element (i.e., the second graphical element). Transparent vector shape filter 506, for instance, may be executed to convert the transparency element and the overlapped element into two new elements with solid fill colors but without the overlapped region. Transparent vector shape filter 506 may also create another new element with for the overlapping portion with a solid fill color that approximates the original overlapping portion.

Transparent image filter 508 is configured to process image elements with transparency. Transparent image filter 508 determines the overlapping region of image elements and creates a new image element that approximates the overlapping region using shape elements and other image elements. Transparent image filter 508 is configured to apply alpha computation and subsequent clipping to polygonal paths. It is to be appreciated that transparent vector shape filter 506 and transparent image filter 508 are separately discussed in this document for clarity reasons. In an implementation, both filters may be combined into a single filter.

Converter module 128 may include other filters for performing other processing steps. For example, converter module 128 may include a filter to convert file data to information that a legacy printer can understand, such as print description language (PDL) command streams. Converter module 128 may also include filters that are not configured to modify file data. For example, converter module 128 may include a filter that sends a copy of the file data to an archive.

It is to be understood that filters 502-510 are modularly configured and form a filter pipeline where the output of one filter serves as the input of another filter. The modular configuration enables different filters to be easily added, modified or removed. The filter pipeline enables a file to be converted efficiently to a format understood by a legacy printer. This capability allows converter module 128 to provide a file to a legacy printer for printing without converting the complex elements in the file to computationally-intensive pixel-based elements, such as rasterized graphical elements (e.g., bitmaps).

Planar Rendering

Planar rendering may be provided as a stage (e.g., the transparent vector shape and image filters 508, 510 of FIG. 5) in a filter pipeline as previously described. This stage is configured to convert files having transparent/translucent images into a printable format for rendering devices and graphics models which do not support transparency functionality, such as legacy rendering devices.

A technique, which may be referred to as alpha blending, may be utilized to provide transparent and translucent graphical elements. As previously described, additional information, referred to as alpha information, may be specified for each pixel that is to be rendered on a surface (e.g., the screen 112 of FIG. 1, a printable medium, and so on). Alpha can be specified in a variety of ways, such as a floating point number that has a range from 0.0 to 1.0. In this instance, if alpha is zero then a corresponding pixel is transparent, and therefore is not rendered. If the alpha for a corresponding pixel is 1.0, then the corresponding pixel is opaque such that it completely covers whatever is "underneath" it. If the alpha value is between 0.0 and 1.0, in this instance, colors for the corresponding pixels are mixed to provide a translucent appearance. For example, if a white rectangle is to be drawn on top of a black rectangle, and the alpha for the white rectangle is specified as 0.5, then the resulting color for the overlapping portions is an equal mixture of black and white.

Graphical elements that are drawn in the form of a vector object, such as text, curves, polygons, filled regions, and so on, typically have a fixed alpha value associated with the entire area of the graphical element that is to be rendered. Other graphical elements, however, may specify an alpha value for each individual pixel of the graphical element. For example, a photographic image of a pumpkin may include an alpha value for each pixel that does not belong to the pumpkin (e.g., a bounding area) to transparent and set alpha values for each pixel that belong to the apple to opaque. In this way, the image provides a built-in mask that specifies how that image of the pumpkin is to be rendered against a background.

Traditional PDLs, however, supported limited scenarios for each graphical element that was to be drawn on a printable medium. In a first scenario, a new pixel was drawn onto a location where there was no existing output from a previous drawing operation, such as when white and black rectangles are drawn on a page and none of the pixels of that white rectangle intersect the pixels of the black rectangle, i.e. share the same location. In this first scenario, none of the pixels of the white and black rectangle affected each other and therefore the traditional PDLs could provide an output as intended.

In a second scenario, a first pixel of a first graphical element was to be drawn onto a location that already had a second pixel provided by a second graphical element that was drawn before the first graphical element. Thus, a portion the first graphical element "overlaps" a portion the second graphical element, which may be referred to as an "overlapping portion" or "overlapping portions". Utilizing traditional PDLs, however, the overlapping portion did not support a transparent/translucent output and therefore would merely override any preexisting pixels. Therefore, pixels in the portion of the first graphical element would opaquely cover pixels in the portion of the second graphical element.

In a third scenario, portions of a output file that contained transparent and overlapping graphical elements for output were rasterized to form a rasterized image, such as a bitmap. Rasterizing a portion of the image file, however, introduces resolution dependency and requires a large amount of memory resources to store rasterized images. Thus, traditional PDL's did not support the concept of alpha, and therefore could not translate a graphical element that is transparent or translucent for output as intended.

Figure 6:
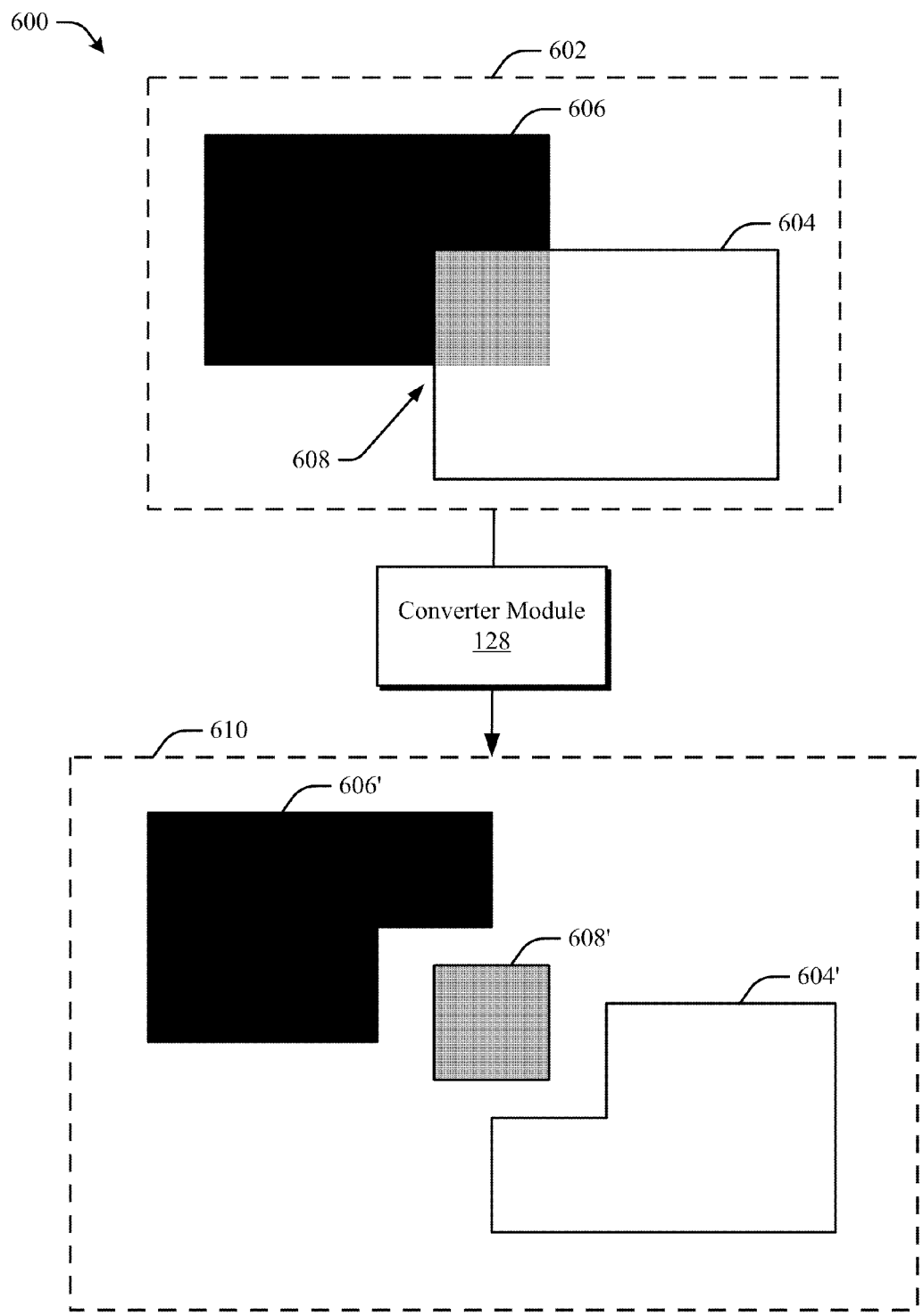
FIG. 6 depicts a translucent overlapping portion of one shape that overlaps an overlapped portion of another shape.

FIG. 6 is an illustration 600 in an exemplary implementation showing graphical elements having an overlapping portions, at least one of which is translucent. A file 602 is shown having a plurality of graphical elements, illustrated as a white rectangle 604 and a black rectangle 606. As shown in FIG. 6, the white rectangle 604 is drawn so that it partially overlaps the black rectangle 606, thereby forming an overlapping portion 608. The file 602 supports transparency functionality such that the white rectangle 604 has an alpha value between 0.0 and 1.0. Therefore, when the white rectangle 604 is displayed over the black rectangle 606, the overlapping portion 608 includes portions of both the white and black rectangles 604, 606. Thus, at least a portion of the black rectangle 606 is visible through the white rectangle 604.

The converter module 128 is implemented to convert the file 602 having translucent and/or transparent portions to a file 610 having a printable format for target entities and other graphical environments which do not support transparency functionality, such as legacy rendering devices. The converting module 128 first converts each portion of the file 602 having a uniform color into a logical shape, such as a polygon. A first shape 604', for instance, includes a solid white portion of the white rectangle 604. A second shape 606' includes a solid black portion of the block rectangle 606. A third shape 608' is taken from the overlapping portions 608 of the white and black rectangles 604, 606. Because each of these shapes 604', 606', 608' do not overlap, each can be drawn with a independent color such that it is not dependent on another color that is already provided for inclusion on the page. For instance, the third shape 608' may be rendered as a mixture of 50% black and 50% white. Therefore, the alpha value for each of the first, second, and third shapes 604', 606', and 608' may be set to opaque (e.g., 1.0).

The converter module 128 may employ an algorithm that processes a page description for a whole page and determines where graphical element intersections occur, i.e. overlapping portions. The algorithm may then convert the graphical element intersections into objects and derive a single color for each graphical element intersection object. The result (e.g., file 610) can therefore be rendered by rendering devices that do not support transparency functionality.

Figure 7:
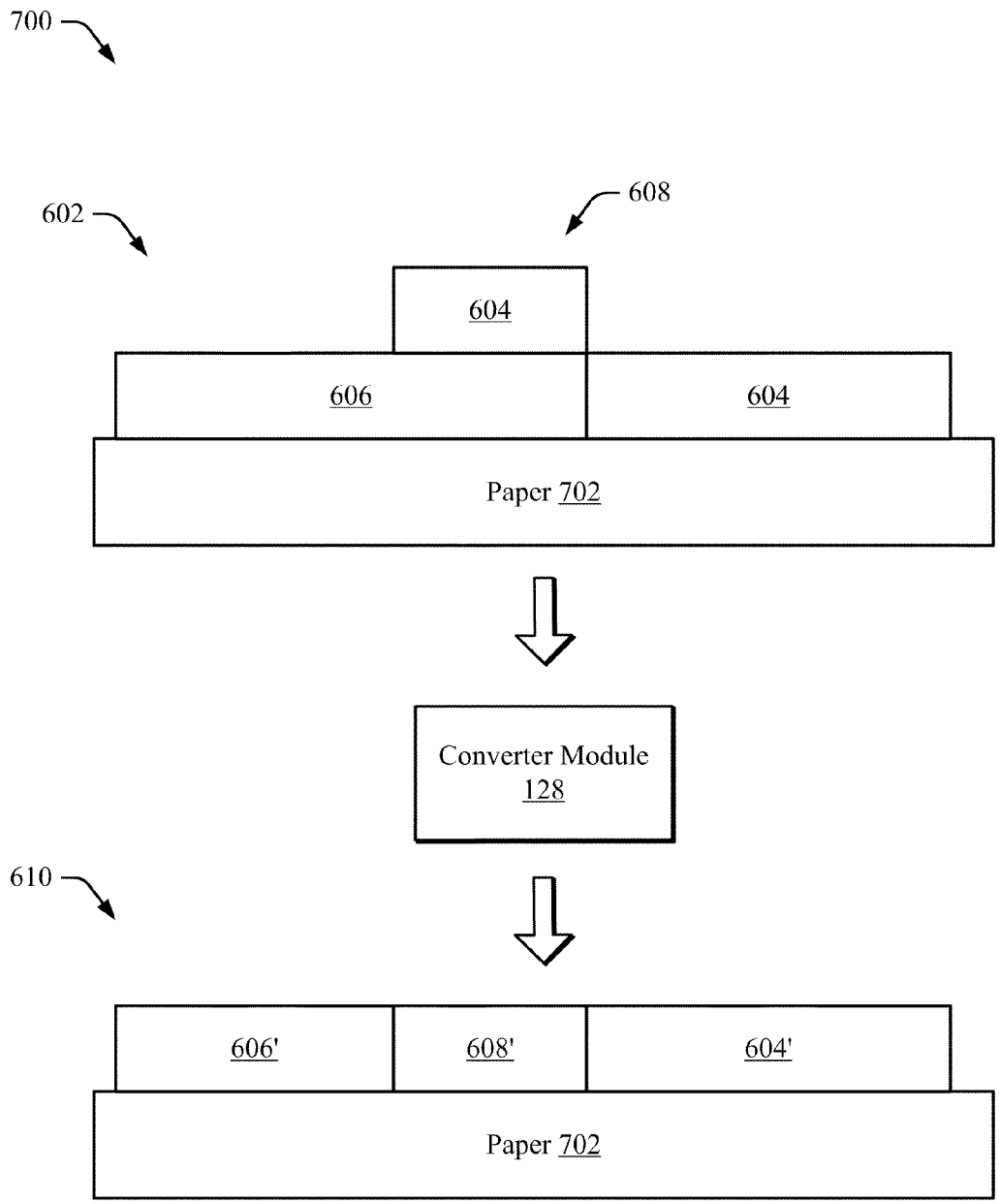
FIG. 7 shows the overlapping and overlapped portions from FIG. 6 depicted as being layered for output from a side perspective.

In this way, planar rendering provides for accurate rendering of the transparent and translucent graphical elements by rendering devices which do not support transparency. The term "planar" is used in reference to layers provided by graphical elements having specified alpha values. FIG. 7 is an illustration of an exemplary implementation showing the files 602, 610 of FIG. 6 as layered for output from a side view. Alpha values are utilized to layer graphical elements, one on top of another. Therefore, file 602 provides a layered image when viewed from the side as shown in FIG. 7. The file 602 has a base layer which represents paper 702, on which, the image is to be printed, which is followed by individual layers formed on top of the paper 702 to form the image of the file 602. Alpha values are used to determine how these layers for the graphical elements (e.g., the white and black rectangles 604, 606) are composed respective to each other. The converter module 128 utilizes planar rendering to essentially flatten these layers of file 602 to a single layer in file 610. For instance, the overlapping portion 608 of file 602 includes multiple layers formed by portions of the white and black rectangles 604, 606. The overlapping portion 608' of file 610, however, includes a single layer which is the result of the overlapping portions that has an alpha value set to opaque such that a rendering device which receives the file 610 can provide an output which gives the appearance of transparency/translucence, even if the rendering device does not support transparency functionality.

Exemplary Procedures

The following discussion describes planar rendering that may be implemented utilizing the previously described systems and environments. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 8:
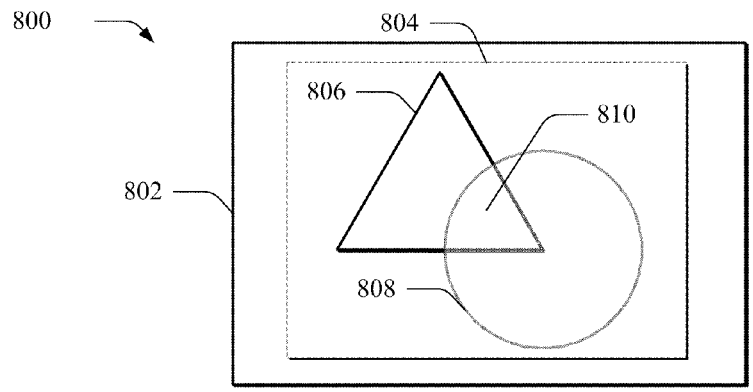
FIG. 8 is an illustration of an exemplary implementation showing an image as intended for printing on a printable medium.

FIG. 8 is an illustration of an exemplary implementation showing an image 800 as intended for printing on a printable medium 802. A segment 804 is illustrated by a dashed rectangle which represents a background of the image 800. The segment 804 includes a triangle 806 and a circle 808 which is displayed "on top" of the triangle 806. Therefore, the triangle 806 and the circle 808 having an overlapping portion 810 as previously described. The circle 808 has an alpha value that is specified between 0.0 (i.e., transparent) and 1.0 (i.e., opaque) such that the circle is translucent. Thus, the overlapping portion 810 enables a portion of the triangle 806 to be displayed "through" a corresponding portion of the circle 808. The triangle 806 and the circle 808 are considered as one group with the segment 804 of the image 800.

Figure 9:
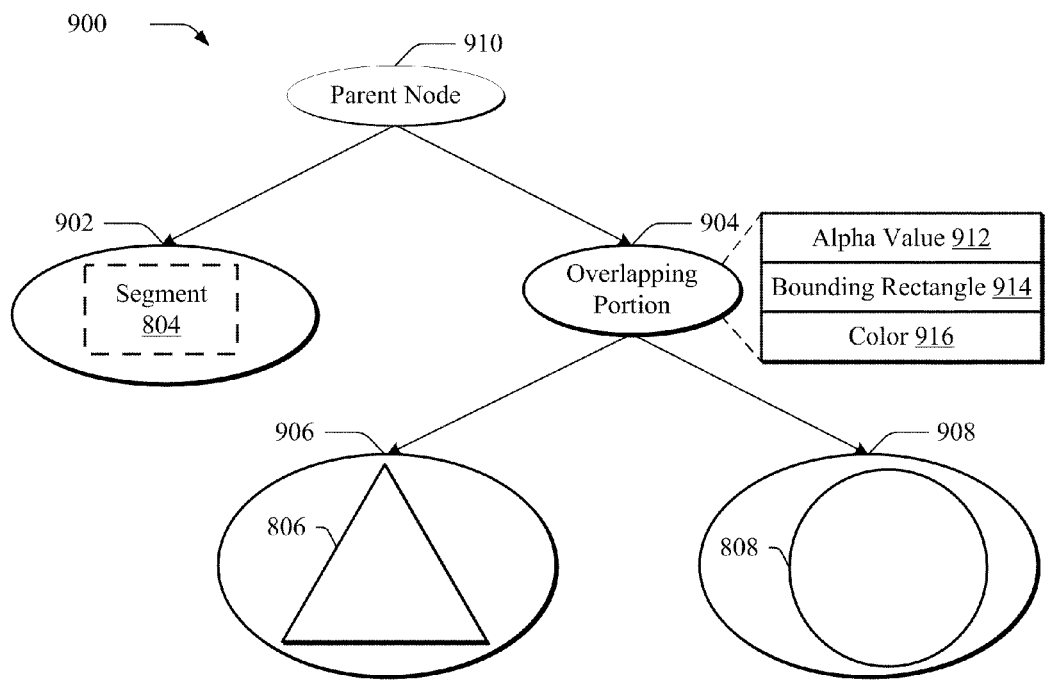
FIG. 9 is an illustration of an exemplary implementation in which the image of FIG. 8 is represented as a tree having a hierarchical structure.

FIG. 9 is an illustration of an exemplary implementation in which the image 800 of FIG. 8 is represented as a hierarchical structure which is depicted as a tree 900. The tree 900 represents imaging operations that are utilized to provide an output on a printable medium of the image 800 of FIG. 8. For instance, the tree 900 may be representative of an image in a document (e.g., the images 312 of the document 304 of FIG. 3). The tree 900 has a first child node 902 which references the portion 804 of the background of the image 800 of FIG. 8 and a second child node 904 which represents the overlapping operation of the triangle 806 and the circle 808.

The plurality of nodes 902-910 may specify a variety of properties. For example, each node of the tree 900 may specify a corresponding alpha value. A leaf node, for instance, references a particular graphical element (e.g., nodes 906, 908). An alpha value specified for the leaf node defines an alpha value for a graphical element referenced by the leaf node. In another example grouping nodes (e.g., nodes 904, 910), which reference a plurality of other nodes, may also specify an alpha value for each child of that node. For example, an alpha value 912 that is specified for the second child node 904 defines an alpha value for each node (e.g., nodes 906, 908) that is a child of the second child node 904. Each of these nodes may also have a property which is a bounding rectangle 914 of the object as it appears, when rendered, and a property that specifies a color 916 for an area described by the node.

Figure 10:
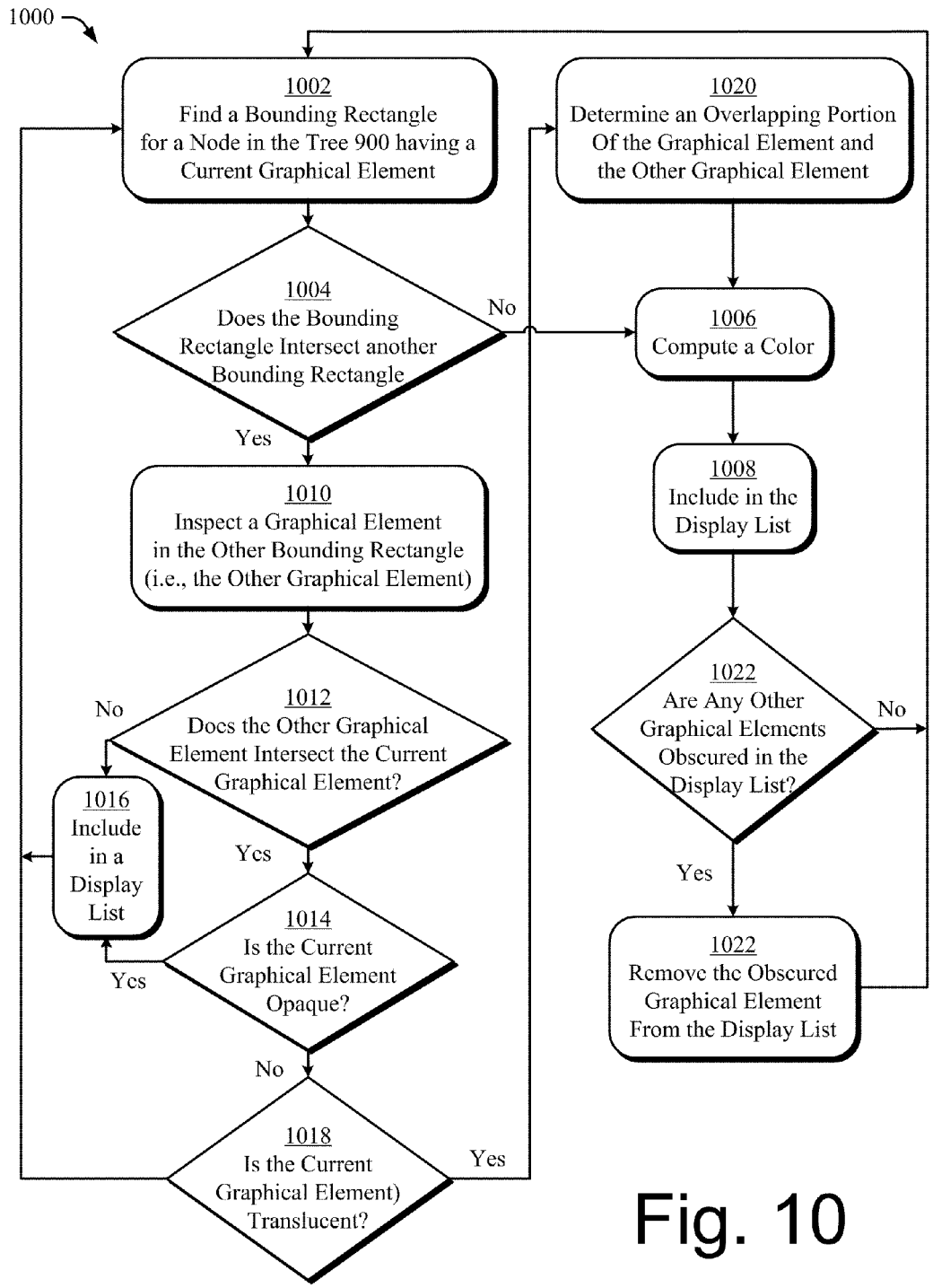
FIG. 10 is a flow diagram depicting an exemplary procedure in which a converter module of FIG. 1 implements an algorithm that walks the tree of FIG. 9 to perform planar rendering.

FIG. 10 is a flow diagram depicting a procedure 1000 in an exemplary implementation in which the converter module of FIG. 1 implements an algorithm that walks the tree 900 of FIG. 9 to perform planar rendering. The discussion of the procedure 1000 of FIG. 10 is made in reference to FIG. 9, the result of which is a tree 1100 shown in FIG. 11.

At block 1002, the converter module walks the tree 900 of FIG. 9 (i.e., traverses a data structure) to find a node of the tree having a bounding rectangle that contains a graphical element. For example, the converter module starts at node 902 which references the segment 804 of the background of the image 800.

At block 1004, the converter module determines if the bounding rectangle of the current node intersects another bounding rectangle of another node that is "below" the current bounding rectangle. For example, the tree 900 may provide a z order for display of graphical elements which is utilized to specify which graphical element is to be displayed on top of another graphical element. The z order is represented in the tree 900 of FIG. 9 such that the left-most nodes are to be displayed below the right-most nodes that are included in the same hierarchical levels of the tree, as will become more apparent in the description of this example.

In this instance, there are no other graphical elements that are to be displayed below or beneath the segment 804, and therefore the bounding rectangle does not intersect another bounding rectangle (block 1004). Therefore, at block 1006, a color is computed for graphical elements in the bounding rectangle as if it was printed on a printable medium. For instance, if the segment 804 has an alpha value which specifies that the segment 804 is translucent, a color of the segment 804 is computed based on the color specified, the alpha value, and a color value of white for the underlying surface utilizing alpha blending techniques as previously described. In this way, the segment 804 is converted for accurate rendering. At block 1008, the segment is added to the display list for output. For example, tree 1100 depicts a display list for output. The segment 804 is added to the tree 1100 as node 1102. The procedure 1000 then returns to block 1002 to find a new current bounding rectangle and determines whether the new bounding rectangle intersects another bounding rectangle (block 1004).

The converter module in this instance walks the tree 900 to find a grouping node (i.e., child node 904) which represents the intersection of the triangle 806 and the circle 808. As previously described, the tree 900 provides a z order for display of graphical elements. Therefore, the converter module marks a next bounding rectangle in the z order for analysis, which in this instance is node 906.

At block 1004, the converter module determines whether the bounding rectangle for the triangle 806 intersects any "lower" (i.e., z order) bounding rectangles. At block 1010, the converter module inspects the other graphical element in the other bounding rectangle and determines if the other graphical element intersects the current graphical element (block 1012). For instance, the converter module may inspect geometric and location descriptions of the respective graphical elements to determine which portions, if any, of the graphical elements overlap. In this instance, the triangle 806 is to be displayed over the segment 804 and therefore there is an intersection.

At block 1014, the converter module determines if the current graphical element is opaque. If so, the current graphical element will cover the other graphical element and therefore the current graphical element may be included in the display list (block 1016) without further computations. If the current graphical element is not opaque (block 1014), then the converter module determines whether the current graphical element is translucent (block 1018). For example, the converter module may inspect the current graphical element to determine its alpha value. If the current graphical element is transparent, then the other graphical element will be displayed "through" the current graphical element without modification. If the current graphical element is translucent, however, transparency functionality employed by the current graphical element is converted for use by graphical environments which do not support transparency as follows.

At block 1020, the converter module determines an overlapping portion of the current graphical element with the other graphical element. For example, the triangle 806 in this instance completely overlaps the segment 804 and therefore the overlapping portion is the triangle 806 itself. The converter module then computes a color for the overlapping portion (block 1006). In this instance, the color is computed based on the colors of the segment 804 and the triangle 806 utilizing alpha blending techniques. The overlapping portion (e.g. the triangle 806) having the computed color of block 1006 is included in the display list (block 1008). The triangle 806 having the computed color is stored, for example, as triangle 1104 at node 1106 of the result tree 1100 of FIG. 11.

The converter module may also optimize the display list. At block 1022, for example, the converter module determines if any other graphical elements in the display list (e.g., tree 1100 of FIG. 11) are obscured by the overlapping graphical element. If so, the obscured graphical element is removed (block 1024), thereby conserving memory resources. The procedure then returns back to block 1002 for a next graphical element.

In this instance, the circle 808 is found at node 908 of tree 900 of FIG. 9. The procedure 1000 continues through blocks 1002-1022 as previously described to compute a new circle 806 having a color computed from the overlap of the circle 808 and the segment 804 to form a new circle 1108. The new circle 1108 has a color computed from the overlap of the circle 808 with the segment 804 of node 1102 and is stored at node 1110 in tree 1100 of FIG. 11.

The procedure is again repeated for the circle 808, but in this instance the overlap of the circle 808 with the triangle 806 is addressed. For example, the procedure 1000 may proceed through blocks 1002-1018 as previously described. At block 1020, the overlapping portion 810 of the circle 808 and the triangle 806 is determined. The converter module, for instance, may compute a portion having a generally uniform color that is provided through the overlap of the translucent circle 808 with the triangle 806. The converter module then arrives at a shape (i.e., a polygon) that approximates the overlapping portion, which in this instance is a "pie" shape 1112 illustrated in FIG. 11. At block 1006, a color is computed for the pie shape 1112 based on the color of the triangle 806 of node 1106 and the circle 1108 of node 1110. The pie shape 1112 and its computed color are then included in the display list, i.e. node 1114 of tree 1100 of FIG. 11.

Figure 11:
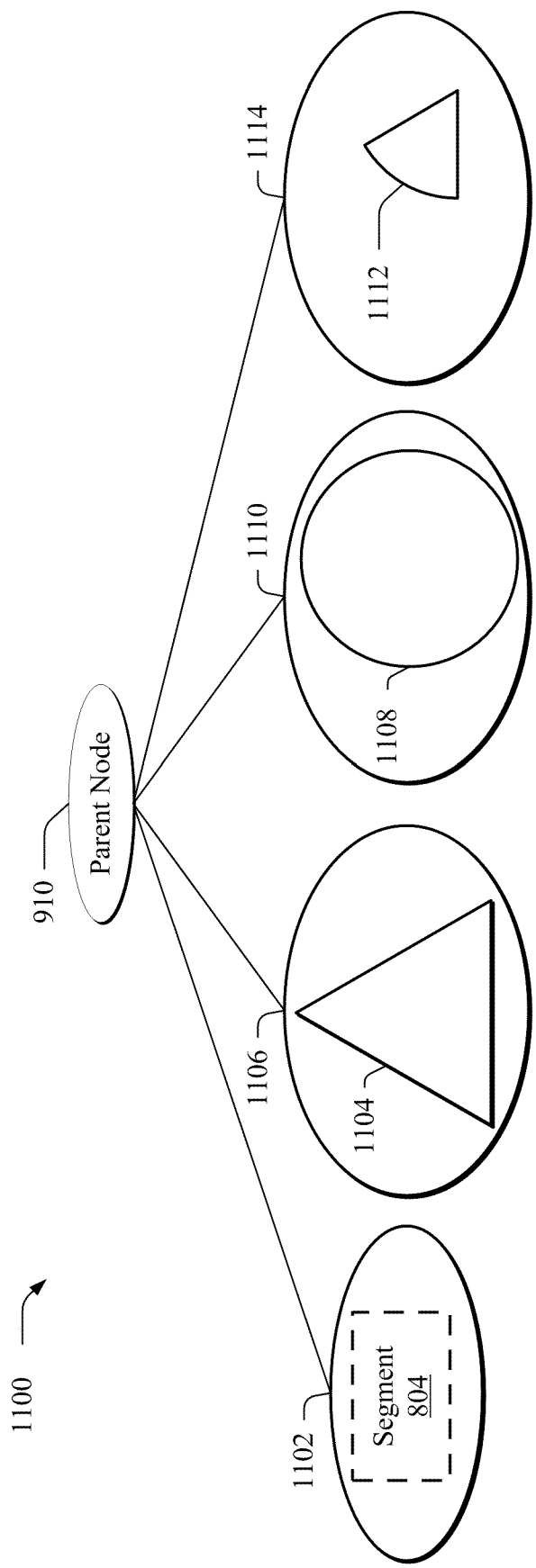
FIG. 11 is an illustration of an exemplary implementation in which a tree is shown which results from processing the tree of FIG. 9 by the procedure of FIG. 10.

Thus, the procedure 1000 of FIG. 10 may be utilized to flatten a hierarchical structure of the tree 900 of FIG. 9 to the result tree 1100 of FIG. 11. The tree of FIG. 11 does not specify translucent alpha values (e.g., each alpha, if specified, is 0.0 or 1.0) and therefore may be utilized in graphical environments which do not support transparency functionality, such as legacy printers. The source tree (e.g., tree 900 of FIG. 9) contains graphical elements at different levels, "grouping" nodes that do not contain imagable data (e.g., node 904 of FIG. 9), and so on. The result tree (e.g., tree 1100 of FIG. 11), however, has one root and graphical elements which are directions from the root. Thus, the result tree is the result of planar mapping of the source tree. In this way, planar mapping may address an arbitrarily deep nested tree and convert it into a flat tree having one level of imagable data having correct color computations.

It should be noted that in an implementation, overlapping portions do not need to be removed from the respective parent object. For instance, the illustrated "pie shape" portion is not removed from the circle or the triangle. Rather, the alpha for the pie shape is set to opaque such that it overwrites the other shapes. For example, each object in the tree may be set as opaque with the corresponding order (i.e., z order) defining which object will be displayed "on top". Thus, a "flat" tree is formed having images with alpha values each set as "1.0" (i.e. opaque) so that it does not matter whether the overlapping portions are removed from the parent graphical elements. In another embodiment, it may be efficient to remove the overlapping portions from the other shapes.

Figure 12:
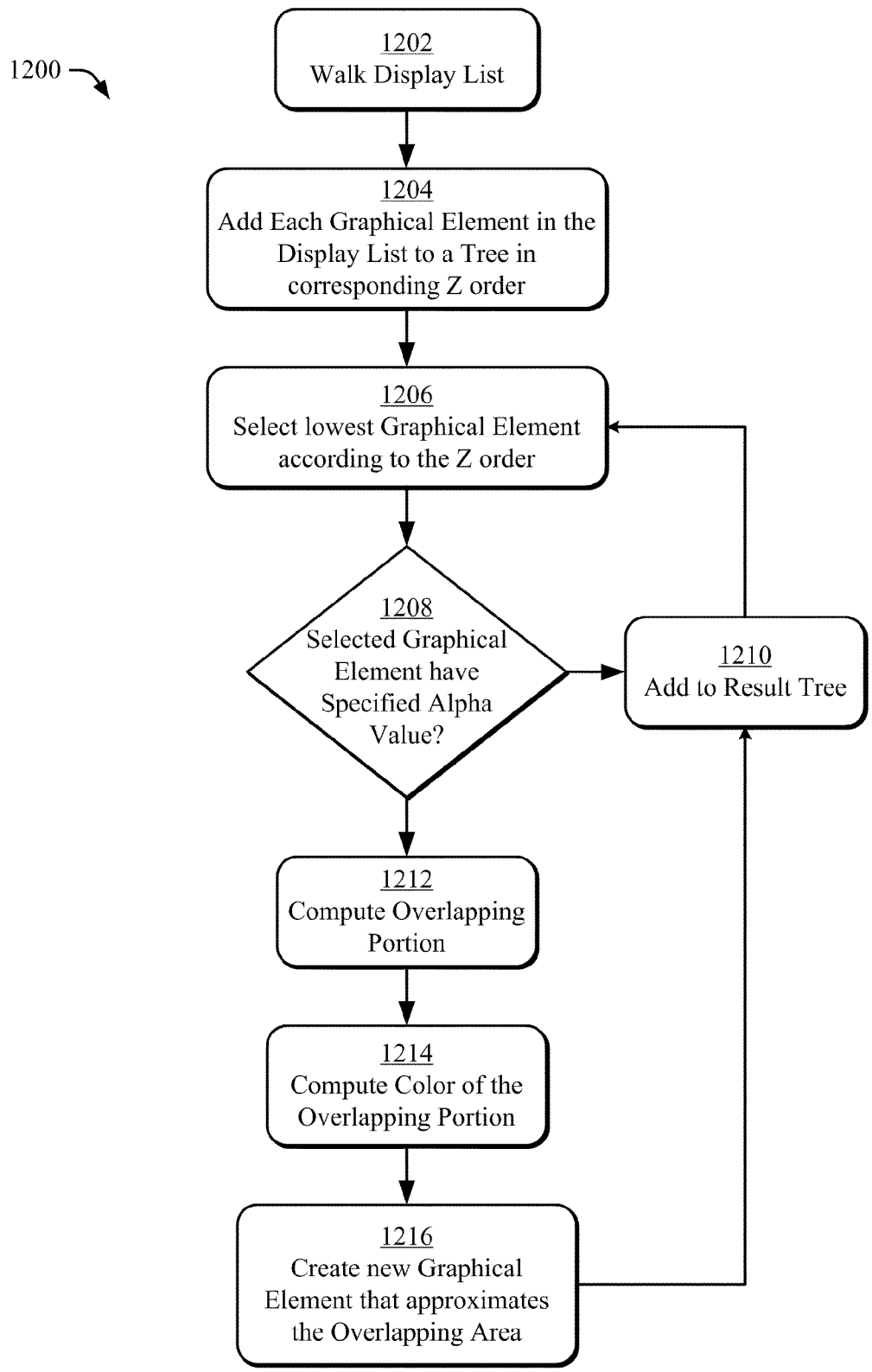
FIG. 12 is a flow diagram depicting a procedure in an exemplary implementation in which the converter module of FIG. 1 performs planar rendering on a display list, the result of which provides for output of translucent graphical elements on a printer which does not support transparency functionality.

FIG. 12 is a flow diagram depicting a procedure 1200 in an exemplary implementation in which a converter module performs planar rendering on a display list, the result of which provides for output of translucent graphical elements on a printer which does not support transparency functionality. At block 1202, a display list of graphical elements is walked. The display list describes an image to be rendered.

At block 1204, each graphical element in the display list is added to a tree in a z order which describes the order, in which, each of the graphical elements is to be displayed with respect to other graphical elements.

At block 1206, the "lowest" graphical element is selected based on the z order of the tree. At decision block 1208, a determination is made as to whether the selected graphical element has a corresponding alpha value. If not, the selected graphical element is added to a result tree (block 1210).

If the selected graphical element does contain alpha information (block 1208), an overlapping portion is computed of the selected graphical element with any previously encountered graphical elements (block 1212). At block 1214, a color for the overlapping portion is computed based on colors and alpha values for any underlying graphical elements. At block 1216, a new graphical element is created which represents the overlapping area and the computed color. At block 1210, the new graphical element is added to the result tree and a next graphical element is selected (block 1206).

Figure 13:
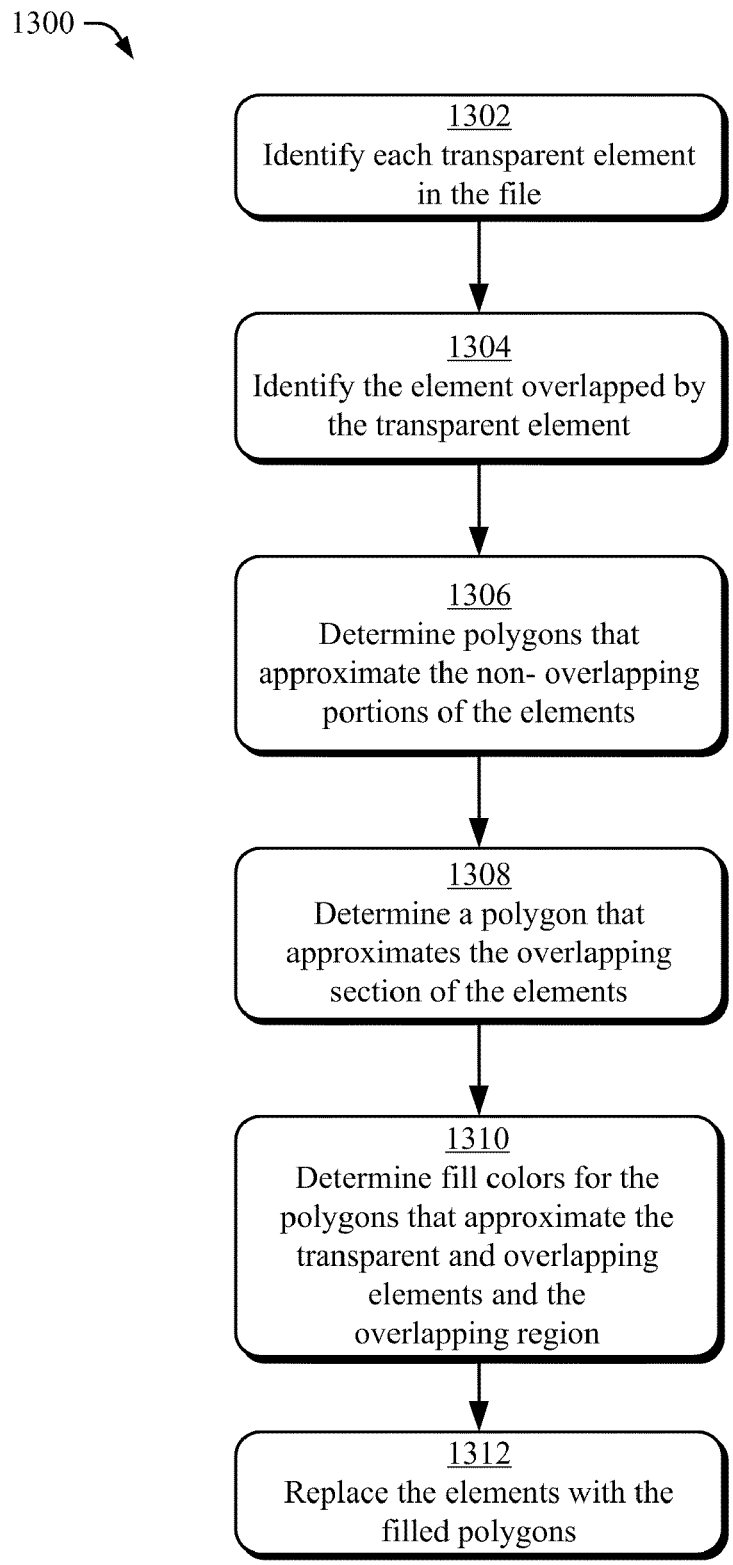
FIG. 13 is a flow diagram of a procedure in an exemplary implementation in which a filter converts a file containing graphical elements with transparency functionality.

FIG. 13 is a flow diagram of a procedure 1300 in an exemplary implementation in which a filter converts a file containing graphical elements with transparency functionality. At block 1302, each translucent graphical element in the file is identified. At block 1304, the graphical element overlapped by the translucent graphical element is identified. It is to be appreciated that multiple graphical elements may be overlapped. But for ease of discussion, only one overlapped element will be discussed in this example process.

At block 1306, shapes that approximate the non-overlapping portions of the elements are determined. At block 1308, a shape that approximates the overlapping section of the elements is determined. At block 1310, fill colors for the shapes that approximate the transparent and the overlapping elements and the overlapping region are determined. At block 1312, the elements are replaced with the filled shapes.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method, comprising:
   approximating a shape that corresponds to an overlapping portion of at least one graphical element that is translucent with another graphical element;
   configuring the approximated shape to form a vector image;
   computing a color for the approximated shape from:
      respective colors of each graphical element; and
      the translucence of the at least one graphical element;
   forming the approximated shape having the computed color into a communication for output;
   presenting each graphical element in a hierarchical structure having a plurality of levels used to form job information associated with the approximated shape; and
   associating metadata with each of the plurality of levels, the metadata specifying supplemental information pertaining to the job information.

2. The method as described in claim 1, further comprising formatting the communication in a print description language (PDL) that is readable by a printer.

3. The method as described in claim 1, further comprising:
   walking a display list wherein each graphical element, when rendered, forms an image; and
   forming a tree from the display list that describes a z order in which each graphical element is to be displayed, one to another, to form the image.

4. The method as described in claim 1, further comprising:
   computing a color for one or more of a plurality of graphical elements, wherein the one or more graphical elements is translucent and does not overlap another graphical element of the plurality of graphical elements;
   computing the color based on a color of the one or more graphical elements and a color representing a printable medium; and
   printing the one or more graphical elements with a printer.

5. The method as described in claim 1, further comprising:
   adding the approximated shape to a display list;
   determining if the approximated shape obscures one or more other graphical elements included in the display list; and
   removing any of the one or more other graphical elements that are obscured from the display list.

6. The method as described in claim 1, further comprising removing an area corresponding to the overlapping portion from one or more graphical elements.

7. One or more computer readable media comprising computer executable instructions that, when executed on a computer, direct the computer to perform operations comprising:
   walking a hierarchical structure of graphical elements that form an image when rendered;
   associating print tickets with at least one of a plurality of levels of the hierarchical structure, each print ticket defining types of processing operations that are to be performed on each level in which the print tickets are associated; and
   for each graphical element that is translucent:
      determining an overlapping portion of the each graphical element with another graphical element;
      computing a color for the overlapping portion based on the each graphical element and the other graphical element; and
      storing the overlapping portion having the computed color in a display list for output in a graphics environment that does not support transparency.

8. The one or more computer readable media as described in claim 7, wherein the computer executable instructions, when executed on the computer, direct the computer to translate the display list into a print description language (PDL) that is readable by a printer.

9. The one or more computer readable media as described in claim 7, wherein the graphics environment includes a printer that is incapable of printing the overlapping portion having the at least one graphical element that is translucent.

10. The one or more computer readable media as described in claim 7, wherein the operations further comprise:
    computing a color for one or more graphical elements that is translucent and does not overlap another graphical element;
    computing the color based on a color of the one or more graphical elements and a color representing a printable medium; and
    printing the at least one graphical element.

11. The one or more computer readable media as described in claim 7, wherein the operations further comprise:
    determining if the overlapping portion obscures one or more other graphical elements included in the display list; and
    removing any of the one or more other graphical elements that are obscured from the display list.

12. The one or more computer readable media as described in claim 7, wherein the operations further comprise removing an area corresponding to the overlapping portion from either the each graphical element or the other graphical element.

13. A computing device, comprising:
    a processor;
    a printer interface for communicatively coupling the processor with a device;
    memory configured to maintain:
       an image storable as a plurality of graphical elements; and
       a converter module that is executable on the processor to:
          approximate a shape that corresponds to an overlapping portion formed by the plurality of graphical elements, wherein at least one graphical element is translucent;
          compute a color for the approximated shape based on respective colors of the plurality of graphical elements and the translucence of the at least one graphical element;
          form a communication for output via the printer interface to the device that includes the approximated shape having the computed color; and
          presenting each graphical element in a hierarchical structure having a plurality of levels used to form job information associated with the approximated shape.

14. The computing device as described in claim 13, wherein the converter module is further executable on the processor to format the communication in a print description language (PDL) that is readable by the device.

15. The computing device as described in claim 13, wherein the printer interface is a printer adapter.

16. The computing device as described in claim 13, wherein the converter module is further executable on the processor to determine whether the graphical element is opaque, and if so, add the opaque graphical element to the communication.

17. The computing device as described in claim 13, wherein the converter module is further executable on the processor to form a tree that describes a hierarchical order in which each graphical element is displayed, one to another, to form the image.

18. The computing device as described in claim 13, wherein the converter module is further executable on the processor to:
   compute a color for one or more graphical elements the one or more graphical elements being translucent and not overlapping another graphical element;
   compute the color based on a color of the one or more graphical elements and a color representing a printable medium; and
   print at least one graphical element.

19. The computing device as described in claim 13, wherein the converter module is further executable on the processor to:
   add the approximated shape to a display list;
   determine if the approximated shape obscures one or more graphical elements included in the display list; and
   remove any of the one or more graphical elements that are obscured from the display list.

20. The computing device as described in claim 13, wherein the converter module is further executable on the processor to remove an area corresponding to the overlapping portion from one of the plurality of graphical elements.

* * * * *